US010531291B2

(12) United States Patent
Bae et al.

(10) Patent No.: US 10,531,291 B2
(45) Date of Patent: Jan. 7, 2020

(54) APPARATUS AND METHOD FOR GENERATING SECURE KEY

(71) Applicant: Samsung Electronics Co., Ltd., Suwon-si, Gyeonggi-do (KR)

(72) Inventors: Beomsik Bae, Suwon-si (KR); Joohyung Lee, Gwacheon-si (KR); Sukjin Yun, Seoul (KR); Doyoung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 15/474,132

(22) Filed: Mar. 30, 2017

(65) Prior Publication Data

US 2017/0289797 A1 Oct. 5, 2017

(30) Foreign Application Priority Data

Apr. 1, 2016 (KR) ........................ 10-2016-0040305

(51) Int. Cl.
*H04W 12/04* (2009.01)
*H04L 9/08* (2006.01)
*H04W 92/20* (2009.01)
*H04W 76/20* (2018.01)

(52) U.S. Cl.
CPC ........... *H04W 12/04* (2013.01); *H04L 9/0869* (2013.01); *H04L 2209/80* (2013.01); *H04L 2463/061* (2013.01); *H04W 76/20* (2018.02); *H04W 92/20* (2013.01)

(58) Field of Classification Search
CPC ............................ H04W 12/04; H04L 9/0869

USPC ............................................................ 726/6
See application file for complete search history.

(56) References Cited

U.S. PATENT DOCUMENTS

| | | | | |
|---|---|---|---|---|
| 7,096,355 | B1 * | 8/2006 | Marvit ................ | H04L 63/0428 380/264 |
| 2009/0282243 | A1 * | 11/2009 | Rose ................... | H04L 63/0435 713/159 |
| 2010/0172496 | A1 * | 7/2010 | Furukawa ............. | H04L 9/0869 380/46 |
| 2012/0008776 | A1 * | 1/2012 | Ishida ................... | H04W 12/04 380/247 |

(Continued)

OTHER PUBLICATIONS

Alcatel-Lucent et al.; Securtiy aspects of LTE-WLAN aggregation; 3GPP TSG-SA Meeting #71; SP-160197; revision of S3-160273; Mar. 9-11, 2016; Gothenburg, Sweden.

*Primary Examiner* — Dant B Shaifer Harriman
(74) *Attorney, Agent, or Firm* — Jefferson IP Law, LLP

(57) ABSTRACT

The present disclosure relates to a 5G or pre-5G communication system for supporting a higher data transfer rate beyond a 4G communication system such as LTD. A method of a terminal connected to another base station (BS) for a second communication system in a wireless environment, the method comprising receiving, via the another BS from a BS for the first communication system, a radio resource control (RRC) connection reconfiguration message comprising information regarding a first key, generating a secure key for a security of the first communication system based on the first key, an identifier (ID) for indicating an algorithm for applying to the first key, a distinguisher for indicating a function of the algorithm indicated by the ID, and transmitting, to the BS, a signal based on the generated secure key.

28 Claims, 11 Drawing Sheets

(56) References Cited

U.S. PATENT DOCUMENTS

| | | | |
|---|---|---|---|
| 2012/0077501 A1* | 3/2012 | Zhang | H04L 9/0869 |
| | | | 455/436 |
| 2012/0244905 A1 | 9/2012 | Zhao et al. | |
| 2013/0305386 A1* | 11/2013 | Zhang | H04L 63/205 |
| | | | 726/27 |
| 2014/0242946 A1* | 8/2014 | Wu | H04W 76/34 |
| | | | 455/410 |
| 2014/0308921 A1* | 10/2014 | Zhang | H04W 92/20 |
| | | | 455/410 |
| 2015/0092942 A1* | 4/2015 | Wager | H04L 63/061 |
| | | | 380/270 |
| 2015/0121490 A1* | 4/2015 | Liu | H04W 12/04 |
| | | | 726/6 |
| 2015/0163202 A1 | 6/2015 | Nair et al. | |
| 2015/0163678 A1 | 6/2015 | Zhang et al. | |
| 2015/0264562 A1* | 9/2015 | Wu | H04W 12/04 |
| | | | 380/270 |
| 2016/0095034 A1* | 3/2016 | Hampel | H04W 36/14 |
| | | | 370/331 |
| 2016/0249210 A1* | 8/2016 | Chang | H04W 12/04 |
| 2016/0366175 A1* | 12/2016 | Basu Mallick | H04L 63/06 |
| 2017/0310431 A1* | 10/2017 | Iyer | H04L 1/1816 |
| 2017/0372310 A1* | 12/2017 | Narasimhan | G06Q 20/401 |
| 2017/0374046 A1* | 12/2017 | Narasimhan | H04L 63/06 |
| 2018/0007552 A1* | 1/2018 | Bae | H04L 63/06 |
| 2018/0343249 A1* | 11/2018 | Hahn | H04L 63/0869 |
| 2018/0367292 A1* | 12/2018 | Shi | H04W 76/10 |
| 2018/0375839 A1* | 12/2018 | Dattolo | H04L 63/0442 |
| 2019/0021002 A1* | 1/2019 | Kang | H04L 9/0869 |
| 2019/0124710 A1* | 4/2019 | Stattin | H04W 76/19 |

* cited by examiner

APPARATUS AND METHOD FOR GENERATING SECURE KEY

CROSS-REFERENCE TO RELATED APPLICATION(S)

The application claims the benefit under 35 U.S.C. § 119(a) of a Korean patent application filed on Apr. 1, 2016 in the Korean Intellectual Property Office and assigned Serial number 10-2016-0040305, the entire disclosure of which is hereby incorporated by reference.

TECHNICAL FIELD

The present disclosure relates to wireless communication. More particularly, the present disclosure relates to an apparatus and a method for generating a secure key (SK) in an advanced wireless environment.

BACKGROUND

In order to satisfy the demand for radio data traffic, which is increasing since 4th generation (4G) communication systems have been commercialized, efforts to develop an advanced 5th generation (5G) communication system, or a pre-5G communication system, are ongoing. For this reason, the 5G communication system, or pre-5G communication system, is called a beyond 4G network communication system, or a post long term evolution (LTE) system.

It is considered that the 5G communication system is implemented in a super-high frequency (mmWave) band (for example, a band of 60 GHz) in order to achieve a high data transfer rate. In order to mitigate a path loss of radio waves and increase a traveling distance of radio waves in the super-high frequency band, beamforming, massive multi-input multi-output (MIMO), full dimensional MIMO (FD-MIMO), an array antenna, analogue beam-forming, and a largescale antenna are being discussed for the 5G communication system.

In addition, in order to enhance a network of a system, technologies such as an evolved small cell, an advanced small cell, a cloud radio access network (RAN), an ultra-dense network, a device to device (D2D) communication, a wireless backhaul, a moving network, a cooperative communication, coordinated multi-points (CoMP), and interference cancellation, or the like are being developed for the 5G communication system.

In addition, hybrid frequency shift keying and quadrature amplitude modulation (FOAM), which is advanced coding modulation (ACM), sliding window superposition coding (SWSC), and filter bank multi-carrier, non-orthogonal multiple access (NOMA), sparse code multiple access, which are advanced access technology, are being developed for the 5G system.

There is an increasing demand for an advanced system in response to an increasing amount of wireless traffic. In addition, there is a demand for methods for guaranteeing reliability of traffic transmitted or received in such an advanced system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for generating a secure key (SK) for guaranteeing reliability of traffic in an advanced wireless environment.

In accordance with an aspect of the present disclosure, a method of a terminal connected to another base station (BS) for a second communication system in a wireless environment, the method comprising receiving, via the another BS from a BS for the first communication system, a radio resource control (RRC) connection reconfiguration message comprising information regarding a first key, generating a secure key for a security of the first communication system based on the first key, an identifier (ID) for indicating an algorithm for applying to the first key, a distinguisher for indicating a function of the algorithm indicated by the ID, and transmitting, to the BS, a signal based on the generated secure key.

In accordance with another aspect of the present disclosure, an apparatus of a terminal connected to another base station (BS) for a second communication system in a wireless environment, the method comprising at least one transceiver, and at least one processor, coupled to the at least one transceiver, configured to: receive, via the another BS from a BS for the first communication system, a radio resource control (RRC) connection reconfiguration message comprising information regarding a first key; generate a secure key for a security of the first communication system based on the first key, an identifier (ID) for indicating an algorithm for applying to the first key, a distinguisher for indicating a function of the algorithm indicated by the ID; and transmit, to the BS, a signal based on the generated secure key.

In accordance with another aspect of the present disclosure, a method of a base station (BS) for a first communication system connected to another BS for a second communication system via an internal interface in a wireless environment, the method comprising: generating a first key by applying a key derivation function (KDF) to a random value and a count value, the random value generated by using a random function; generating a secure key for a security of the first communication system based on the generated first key, an identifier (ID) for indicating an algorithm for applying to the first key, and a distinguisher for indicating a function of the algorithm indicated by the ID; and transmitting, to a terminal connected to the another BS, a signal based on the generated secure key.

In accordance with another aspect of the present disclosure, an apparatus of a base station (BS) for a first communication system connected to another BS for a second communication system via an internal interface in a wireless environment, the method comprising at least one transceiver, and at least one processor, coupled to the at least one transceiver, configured to: generate a first key by applying a key derivation function (KDF) to a random value and a count value, the random value generated by using a random function; generate a secure key for a security of the first communication system based on the generated first key, an identifier (ID) for indicating an algorithm for applying to the first key, and a distinguisher for indicating a function of the algorithm indicated by the ID; and transmit, to a terminal connected to the another BS, a signal based on the generated secure key.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
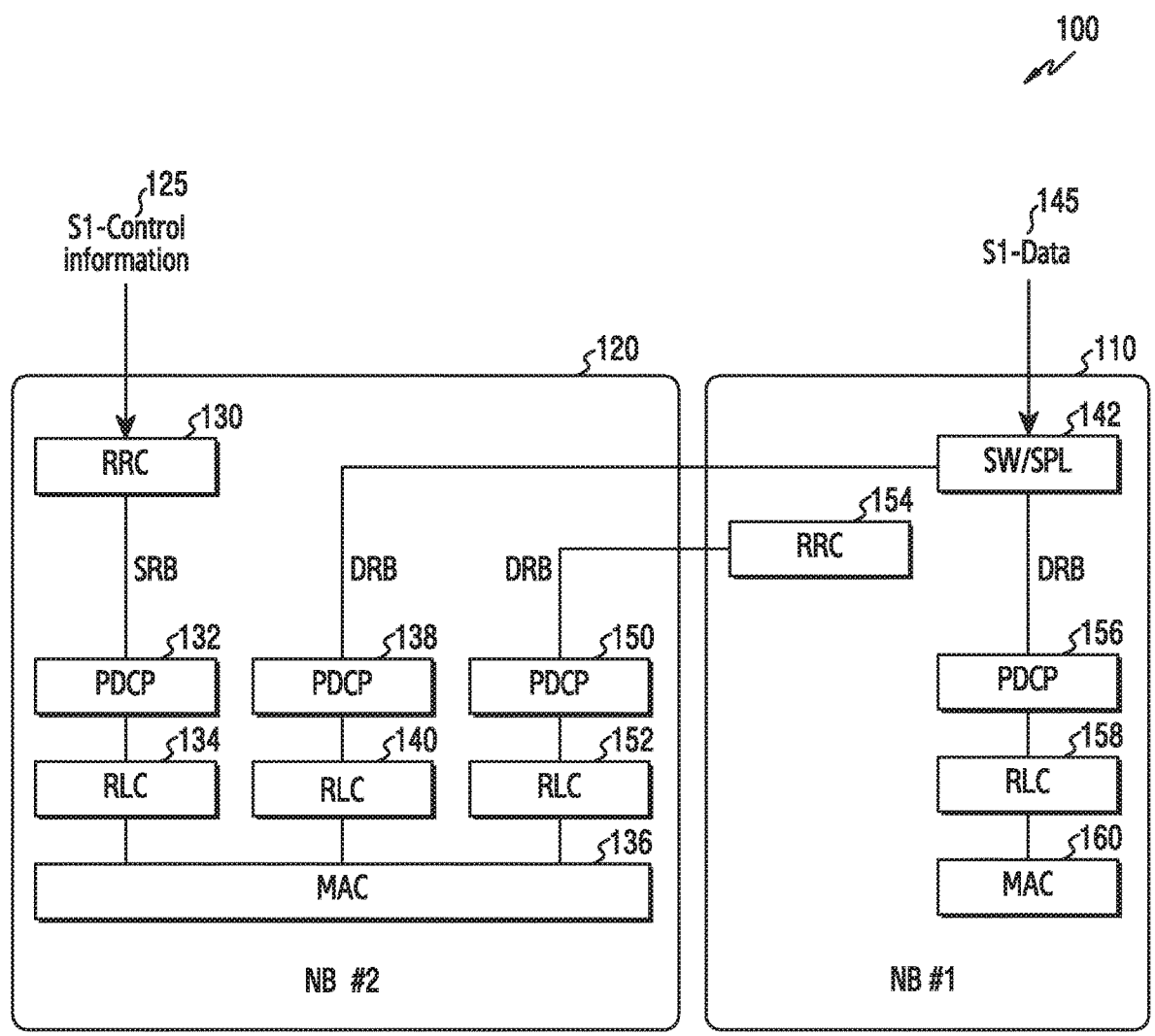
FIG. 1 illustrates a view showing an example of a protocol stack of base stations (BSs) (node Bs (NBs)) for two different interworked systems according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the present disclosure which will be described herein below, hardware-based approach methods will be described by way of an example. However, since various embodiments of the present disclosure include technology using both hardware and software, various embodiments of the present disclosure do not preclude software-based approach methods.

The following description relates to an apparatus and a method for generating a secure key (SK) in an advanced wireless environment.

The term indicating control information, the terms indicating network entities, the terms indicating messages, and the terms indicating components in the apparatus, which are used in the following description, are just for convenience of explanation. Accordingly, the present disclosure is not limited to the terms which will be described below, and other terms having the same technical meanings can be applied to the present disclosure.

Due to increasing use of high quality contents and increasing utilization of big data, development of advanced wireless communication technology and standardization works are accelerating. Methods for merging a system for current wireless communication technology and a system for advanced wireless communication technology are being studied in order to use the advanced wireless communication technology. Such methods have the merit that they can maintain infrastructure for current wireless communication technology.

Traffic transmitted or received via a wireless environment may be exposed to users other than a targeted user due to a tap or modulation. In other words, the wireless communication technology guarantees mobility, but may be vulnerable to leakage of private information which may occur due to high accessibility. Accordingly, in order to prevent leakage of private information, the current wireless communication technology provides a security function that does not allow other users to use information included in the traffic even when other users receive (or steal) traffic. To achieve the security function, the current wireless communication technology guarantees reliability of transmitted or received traffic by using an SK. However, the advanced wireless communication technology does not provide the SK for providing the security function.

Accordingly, in the following description, there are provided an apparatus and a method for generating an SK for providing a security function regarding an advanced wireless communication system in an environment in which a current wireless communication system and an advanced wireless communication system coexist.

FIG. 1 illustrates a view showing an example of a protocol stack of base stations (BSs) for two different interworked systems according to an embodiment of the present disclosure.

Referring to FIG. 1, a set of BSs 100 may include a first BS (node B (NB) #1) 110, and a second BS (NB #2) 120.

The first BS 110 may be a BS of a wireless communication system which newly enters an existing wireless communication system. The first BS 110 may be a BS for advanced wireless communication. The first BS 110 may be a BS of an advanced wireless communication system (hereinafter, referred to as a first system) which is introduced to complement or sub-serve a current wireless communication system. For example, the first BS 110 may be a BS of a 5th generation (5G) system. In this case, the first BS 110 may be a BS which transmits or receives signals using a higher frequency in order to guarantee a wider bandwidth or the like. Since the first BS 110 transmits or receives signals using a higher frequency, the first BS 110 may guarantee a transmission speed, but may be vulnerable to a path loss, interference, or the like due to traveling strength of signals, and may have a relatively narrow coverage area. The first BS 110 may be a BS which requires an SK for transmitting reliability-guaranteed data or a procedure for generating the SK.

The second BS 120 may be a BS for current wireless communication (hereinafter, referred to as a second system). The second BS 120 may be a pre-deployed BS. For example, the second BS 120 may be a BS of a long term evolution (LTE) communication system. The second BS 120 may complement some functions of the first BS 110 by interworking with the first BS 110. For example, the second BS 120, which has a wider coverage area than the coverage area of the first BS 110, may cover a coverage area that is not covered by the first BS 110. In another example, the second BS 120 may provide a path for the first BS 110 and a terminal for the sake of a radio resource control (RRC) connection between the first BS 110 and the terminal. The second BS 120 may be a BS which has defined an SK for transmitting reliability-guaranteed data or a procedure for generating the SK.

In the following description, the first BS 110 and the second BS may be referred to as the term "NB" or other terms. For example, the first BS 110 and the second BS 120 may be referred to as the terms "BS," "evolved NB," "access point," or the like according to communication standards or communication methods.

The protocol stack of the second BS 120 may include an RRC 130, a packet data convergence protocol (PDCP) 132, a radio link control (RLC) 134, and a media access control (MAC) 136.

The RRC 130 may generate or manage a control message between a terminal and an evolved packet core (EPC). The PDCP 132 may compress a header portion of an internet protocol (IP) packet (a PDCP service data unit (SDU)) provided from the RRC 130, may cipher the IP packet, and may insert a PDCP header including a PDCP serial number (SN) into the IP packet. The RLC 134 may provide an SDU transmission service regarding information provided from the PDCP 132, or may divide the SDU. The MAC 136 may perform logic channel multiplexing, hybrid automatic repeat request (HARQ) retransmission management, uplink/downlink scheduling, or the like with respect to information provided form the RLC 134. For example, for the sake of control information 125 received via an S1 interface, the second BS 120 may set a signaling radio bearer (SRB) via the RRC 130, the PDCP 132, the RLC 134, and/or the MAC 136. The second BS 120 may provide the control information 125 to the terminal via the set SRB.

In addition, the protocol stack of the second BS 120 may further include a PDCP 138 and an RLC 140.

The PDCP 138 may compress a header portion of an IP packet which is provided from a switching/splitting (SW/SPL) 142 included in the protocol stack of the first BS 110, may cipher the IP packet, and may insert a PDCP header including a PDCP SN into the IP packet. The RLC 140 may provide an SDU transmission service regarding information provided from the PDCP 138 or may divide the SDU. The MAC 136 may perform logic channel multiplexing, HARQ retransmission management, uplink/downlink scheduling, or the like with respect to information provided from the RLC 140. For example, when processing of data 145 received via an S1 interface switches from the first BS 110 to the second BS 120, the second BS 120 may set a data radio bearer (DRB) via the PDCP 138, the RLC 140, and/or the MAC 136. In another example, when the first BS 110 determines to divide the process of the data received via the S1 interface with the second BS 120, the second BS 120 may set a DRB regarding the divided data via the PDCP 138, the RLC 140, and/or the MAC 136. The second BS 120 may provide the data to the terminal via the set DRB.

In addition, the protocol stack of the second BS 120 may further include a PDCP 150 and an RLC 152.

The PDCP 150 may compress a header portion of an IP packet provided from the SW/SPL 142 of the first BS, may cipher the IP packet, and may insert a PDCP header including a PDCP SN into the IP packet. The RLC 152 may provide an SDU transmission service regarding information provided from the PDCP 150, or may divide the SDU. The MAC 136 may perform logic channel multiplexing, HARQ retransmission management, uplink/downlink scheduling, or the like with respect to information provided from the RLC 152. For example, when the second BS 120 receives control information for the first system from an RRC 154 of the first BS 110, the second BS 120 may set a DRB via the PDCP 150, the RLC 152, and/or the MAC 136. The second BS 120 may provide the control information related to the first BS 110 to the terminal via the set DRB (or an SRB when necessary). In other words, the first BS 110 may provide, via the second BS 120, the control information to the terminal that the first BS 110 will communicate with.

The protocol stack of the first BS 110 may include the RRC 154.

The RRC 154 may be used for an RRC connection between the first BS 110 and the terminal. The RRC 154 may be set as software. The control information related to the first BS 110 may be provided to the terminal via the second system (or the second BS 120) based on an internal interface between the first BS 110 and the second BS 120.

The protocol stack of the first BS 110 may further include the SW/SPL 142, a PDCP 156, an RLC 158, and a MAC 160.

According to a determination of the first BS 110, the SW/SPL 142 may allow the data 145 received by the first BS 110 to be received by the terminal via the second BS, or may allow a part of the data 145 divided from the data 145 to be received by the terminal. For example, when it is determined that the terminal communicating with the first BS 110 is located out of a coverage area of the first BS 110, or it is determined that the terminal communicating with the first BS 110 is located in an area where the terminal is vulnerable to interference, the first BS 110 may allow, via the SW/SPL 142, the data 145 or a part of the data 145 to be received by the terminal via the second BS. That is, the SW/SPL 142 may be a protocol for guaranteeing diversity of the first system (or the first BS 110).

The PDCP 156 may compress a header portion of an IP packet regarding the data 145 (when the first BS 110 determines not to switch) or a part of the data 145 (when the first BS 110 determines to divide the data) provided from the SW/SPL 142, may cipher the IP packet, and may insert a PDCP header including a PDCP SN into the IP packet. The RLC 158 may provide an SDU transmission service regarding information provided from the PDCP 156, or may divide the SDU. The MAC 160 may perform logic channel multiplexing, HARQ retransmission management, uplink/downlink scheduling, or the like with respect to information provided from the RLC 158.

As described above in the description of FIG. 1, the first BS 110 of the first system may complement the characteristics of the first system by interworking with the second BS 120 of the second system.

Figure 2:
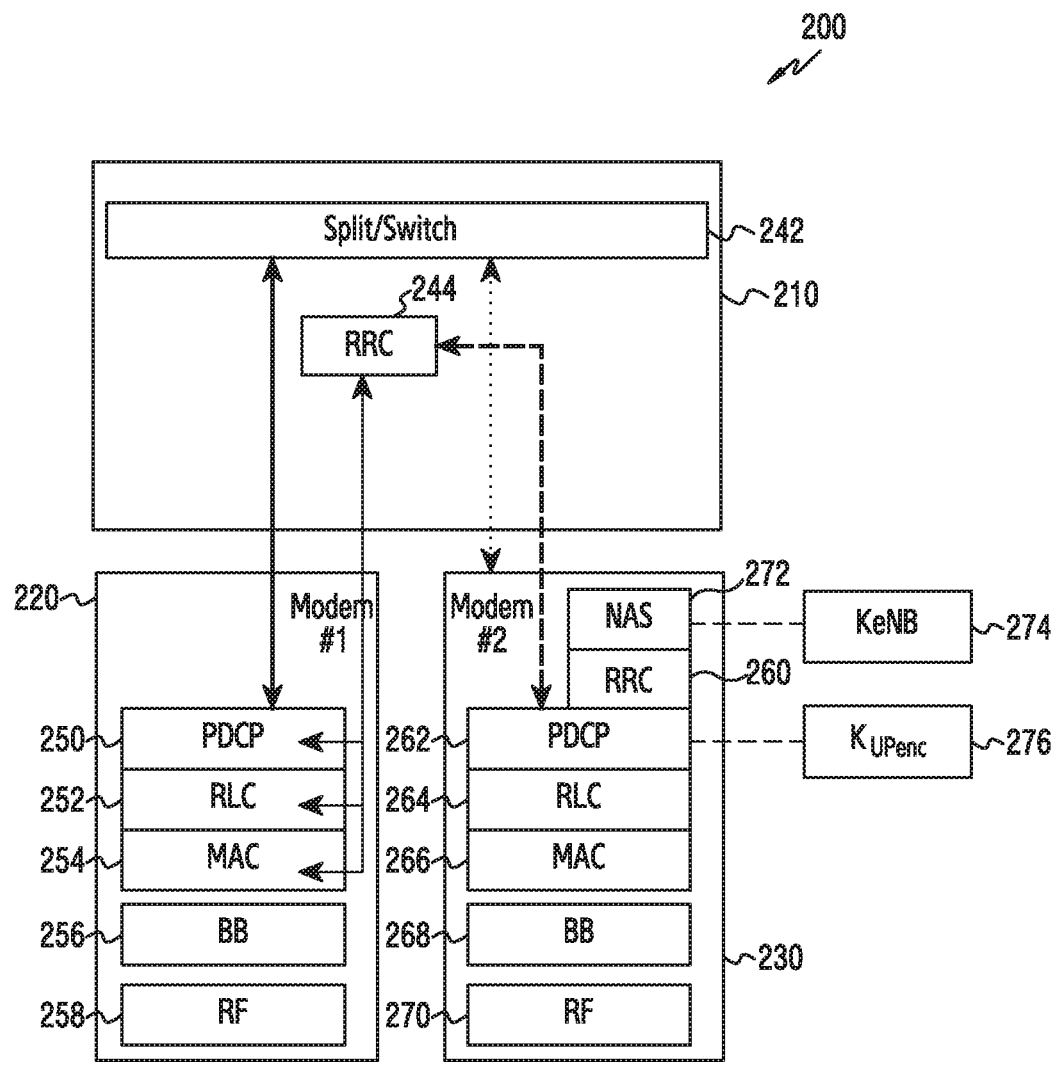
FIG. 2 illustrates a view showing an example of a terminal (user equipment (UE)) which can use different wireless communication systems according to an embodiment of the present disclosure.

FIG. 2 illustrates a view showing an example of a terminal which can use different wireless communication systems according to an embodiment of the present disclosure.

Referring to FIG. 2, a terminal 200 may include an operating system (OS) 210, a first modem 220, and a second modem 230.

The OS 210 may process a signal that the terminal 200 will transmit via a path related to the first modem.

In some embodiments, the OS 210 may determine a transmission path of a signal to be transmitted according to a channel quality between the terminal 200 and the first BS 110. For example, when it is determined that the terminal 200 is located out of a coverage area of the first BS 110 or it is determined that the terminal 200 is located in an area where the terminal 200 is vulnerable to interference, the OS 210 may process the signal using a split/switch 242, such that the signal to be transmitted is transmitted via a path related to the second modem 230. In another example, when it is determined that the terminal 200 is located out of the coverage area of the first BS 110 or it is determined that the terminal 200 is located in an area where the terminal 200 is vulnerable to interference, the OS 210 may process the signal using the split/switch 242, such that a part of the signal to be transmitted is transmitted via the second path. In another example, when it is determined that the channel quality between the terminal 200 and the first BS 110 is good, the OS 210 may process the signal without using the split/switch 242, such that the signal to be transmitted is transmitted via a path related to the first modem 220. Herein, the signal transmitted via the path related to the first modem 220 (hereinafter, referred to as a first path) may be received by the first BS 110 regardless of the second BS 120.

In some other embodiment, the OS 210 may determine a transmission path of a signal to be transmitted according to the type of the signal to be transmitted. For example, when the signal to be transmitted is control information, the OS 210 may process the signal such that the signal is transmitted via the second path. The OS 210 may process the signal using an RRC 244, such that the signal is transmitted via the second path. That is, the control information may be received by the first BS 110 via the second path through a user plane of the second system. In another example, when the signal to be transmitted is data, the OS 210 may process the signal such that the signal is transmitted via the first path. That is, the data may be received by the first BS 110 via the first path through a user plane or a control plane of the first system.

The OS 210 may process a signal received by the terminal 200. The OS 210 may process the signal received by the terminal 200 such that the received signal is provided to an application layer. For example, when the terminal 200 receives data via the first path, the OS 210 may process the received data such that the data is provided to the application.

The first modem 220 may process a signal related to the first system. For example, the first modem may process a signal related to the first system using a PDCP 250, an RLC 252, a MAC 254, a baseband (BB) 256, and a radio frequency (RF) 258. The PDCP 250, the RLC 252, and the MAC 254 may perform similar functions as those of the PDCP 156, the RLC 158, and the MAC 160 shown in FIG. 1. The BB 256 and the RF 258 may be normally referred to as a physical (PHY). In some embodiments, the BB 256 and the RF 258 may be implemented by using circuitry. The BB 256 may process a BB of a signal to be transmitted or a BB of a received signal. The RF 258 may up-convert a signal to be transmitted or down-convert a received signal.

The second modem 230 may process a signal related to the second system. For example, the second modem may process a signal related to the second system using an RRC 260, a PDCP 262, an RLC 264, a MAC 266, a BB 268, and an RF 270. The RRC 260, the PDCP 262, the RLC 264, and the MAC 266 may perform similar functions as those of the RRC 130, the PDCP 150, the RLC 152, and the MAC 136 shown in FIG. 1. The BB 268 may perform a similar function to that of the BB 256, and may be implemented similarly (for example, by using circuitry). The RF 270 may perform a similar function to that of the RF 258 and may be implemented similarly (for example, by using circuitry).

The second modem 230 may provide a security function to maintain reliability of data to be transmitted. The second modem 230 may use a non-access stratum (NAS) 272 for security of data. The NAS 272 may include a key $K_{enB}$ 274 to generate an SK $K_{UPenc}$ 276 regarding data. The key $K_{enB}$ 274 may be a key which is generated based on a key $K_{ASME}$ used in a terminal and a mobility management entity (MME). The key $K_{enB}$ 274 may be a key which is shared by the terminal 200 and the second BS 120. The SK $K_{UPenc}$ 276 regarding the data may be used in the PDCP 262 to cipher the data to be transmitted. For example, the second modem 230 may cipher the data related to the second system using the SK $K_{UPenc}$ 276 derived based on the key $K_{enB}$ 274. In another example, the second modem 230 may cipher control information or an RRC of the first system using the SK $K_{UPenc}$ 276 derived based on the key $K_{enB}$ 274. In this case, the ciphered control information may be received by the first BS 110 via the second path.

The second modem 230 may provide a security function to verify reliability of received data. The received data may be ciphered data. The second modem 230 may decipher the received data by using the SK $K_{UPenc}$ 276. When the deciphering succeeds, the terminal 200 may determine that the received data includes reliable content.

Unlike the second modem 230, the first modem 220 may not include a configuration corresponding to the NAS 272. In addition, the first BS 110 and the terminal 200 (or the first modem 220) have no key to be shared with each other for security of data transmitted or received via the first path. Accordingly, the data transmitted or received via the first path may not be guaranteed at a transmission side or a reception side.

To solve a reliability problem of data, a method of using a key related to the second system (for example, the SK $K_{UPenc}$ 276) in the first system may be sought. However, this method may not guarantee security due to an increasing key exposure frequency and may violate security regulations.

Accordingly, there is a demand for an apparatus and a method for generating an SK for guaranteeing reliability of data transmitted or received via the first path, without changing the infrastructure of the second system.

Figure 3:
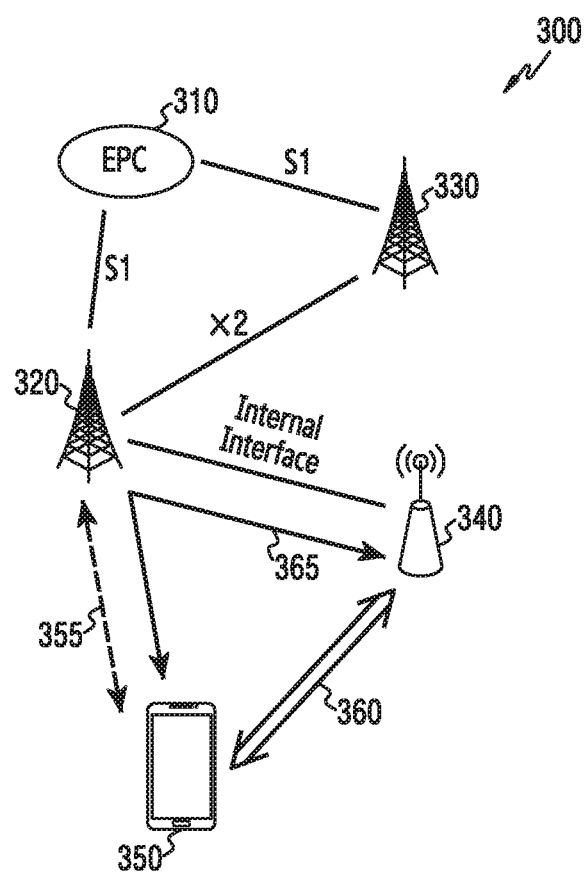
FIG. 3 illustrates a view showing an example of a wireless environment in which different systems coexist according to an embodiment of the present disclosure.

FIG. 3 illustrates a view showing an example of a wireless environment in which different systems coexist according to an embodiment of the present disclosure.

Referring to FIG. 3, a wireless environment 300 may include an EPC 310, a second BS 320, a third BS 330, a first BS 340, and a terminal 350.

The EPC 310 may be a core network for the second system. The EPC 310 may sub-serve communication of the terminal 350. For example, the EPC 310 may perform authentication, charging, and end-to-end connection management for the terminal 350. In another example, the EPC 310 may interwork with various wireless connection technologies. The EPC 310 may separate data and control information and may sub-serve the communication of the terminal 350.

The EPC 310 may include an MME, a serving gateway (S-GW), a packet data network gateway (P-GW), and/or a home subscriber server (HSS).

The MME may be a node which processes a control plane in the EPC 310. For example, the MIME may connect or disconnect a bearer regarding the terminal 350 in order to sub-serve the communication of the terminal 350. In another example, the MIME may control the terminal 350 to shift from an idle state to an active state. In still another example, the MIME may manage an SK ($K_{ASME}$) for the terminal 350.

The S-GW may be a node which processes a user plane in the EPC 310. For example, the S-GW may support mobility of the terminal. In another example, the S-GW may support mobility between the second system (for example, LTE) and at least one of a global system for mobile communication (GSM), a general packet radio service (GPRS), a high speed packet access (HSPA), and the first system (for example, a 5G system). In still another example, the S-GW may collect charging and statistical information.

The P-GW may be a node which connects to a packet exchange network such as the Internet in the EPC 310. For example, the P-GW may allocate an IP address to the terminal 350.

The HSS may include a database for managing subscriber information of the second system in the EPC 310. For example, the HSS may manage subscriber information for controlling a call/session, such as managing registration/change of a subscriber like the user of the terminal 350, authenticating, giving authority, session routing, and charging.

The second BS 320 and the third BS 330 may be BSs for the second system.

The second BS 320 may provide a wireless service to the terminal 350. For example, the second BS 320 may provide control information via a path 355 such that the terminal 350 located within a coverage area of the second BS 320 communicates with another peer. In another example, the second BS 320 may relay signals from the EPC 310 or the like such that the terminal 350 communicates with another peer. In still another example, the second BS 320 may provide data to the terminal 350 via the path 355.

The second BS 320 may be functionally connected with the EPC 310 via an S1 interface. The second BS 320 may be functionally connected, via an X2 interface, with the third BS 330, which is functionally connected with the EPC 310 via the S1 interface.

The second BS 320 and the third BS 330 may be fixed devices.

The first BS 340 may be a BS for the first system.

The first BS 340 may provide a wireless service to the terminal 350.

For example, the first BS 340 may provide control information such that the terminal 350 located within a coverage area of the first BS 340 communicates with another peer. The control information may be transmitted to the terminal 350 via the second BS 320, which is connected with the first BS 340 via an internal interface. The control information may be transmitted from the first BS 340 to the terminal 350 via the second BS 320 (that is, may be transmitted via the second path) in order for the terminal 350 to use the newly entered or newly introduced first system while maintaining the currently established second system (for example, the EPC 310, the second BS 320, or the like). In other words, the first BS 340 may provide the control information to the terminal 350 via a path 365.

In another example, the first BS 340 may provide data to the terminal 350 located within the coverage area of the first BS 340. The data may be directly transmitted to the terminal 350. In other words, the first BS 340 may provide the data to the terminal 350 via a path 360.

The terminal 350 may be a device which communicates with another peer. The terminal 350 may be a device having mobility. For example, the terminal 350 may be a mobile phone, a smart phone, a music player, a portable game console, a navigation system, a laptop computer, or the like. The terminal 350 may be referred to as a mobile station, a terminal, or the like.

The terminal 350 may be located within the coverage area of the second BS 320 and may be located within the coverage area of the first BS 340. The terminal 350 may be provided with a service regarding the second system via the second BS 320, and may be provided with a service regarding the first system via the first BS 340.

As described above, regarding the signal transmitted or received via the path 355 and the signal transmitted or received via the path 365, reliability can be guaranteed based on the SK $K_{UPenc}$ shown in FIG. 2. However, regarding a signal transmitted or received via the path 360, reliability cannot be guaranteed based on current security technology.

In order to guarantee the security of the signal transmitted or received via the path 360 or the reliability of the signal transmitted or received via the path 360, the present disclosure provides an SK for security of the first system.

Figure 4:
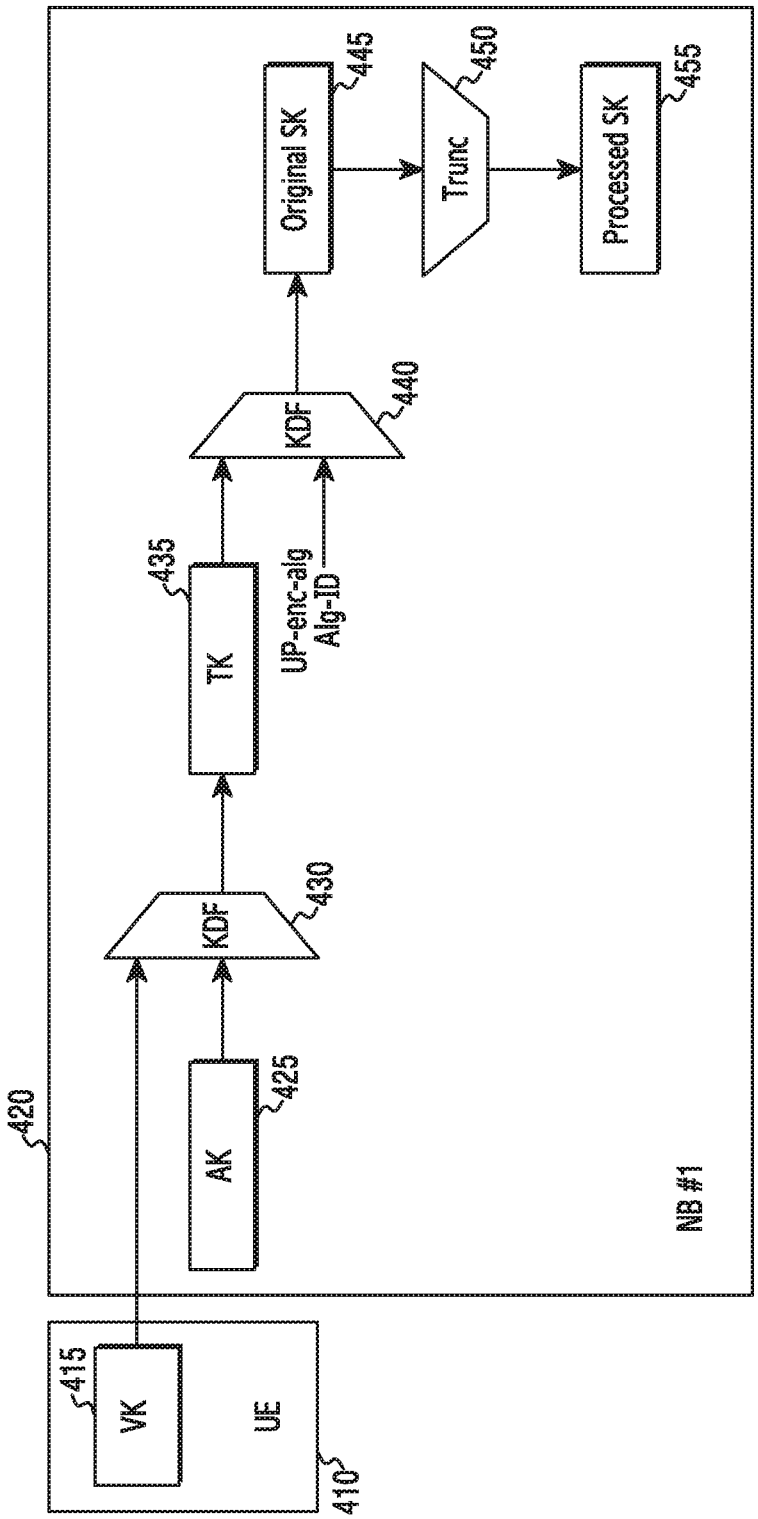
FIG. 4 illustrates a view showing an example of a procedure for generating, by a BS, a secure key (SK) by exchanging parameters between a terminal and the BS according to an embodiment of the present disclosure.

FIG. 4 illustrates a view showing an example of a procedure for generating, by a BS, an SK by exchanging parameters between a terminal and the BS according to an embodiment of the present disclosure.

Referring to FIG. 4, a terminal 410 may be a terminal which connects to a BS of the second system (that is, the second BS). In addition, the terminal 410 may be a terminal which performs an RRC connection procedure with a BS of the first system (that is, the first BS 420).

The terminal 410 and the first BS 420 require an SK to guarantee reliability of data of a user plane transmitted or received via the first path (for example, the path 360 of FIG. 3).

The terminal 410 may generate a virtual key (VK) 415 for generating the SK. The VK 415 may be generated by using a random function.

The VK 415 may have various sizes. For example, the VK 415 may be configured with 258 bits. In another example, the VK 415 may be configured with 128 bits.

The terminal 410 may transmit the generated VK 415 to the first BS 420 via the second path. For example, the terminal 410 may transmit the VK 415 to the first BS 420 via the second path in an RRC signaling procedure. Since the VK 415 is transmitted via the second path, which is a ciphering path, the VK 415 may be robust to exposure to the outside.

In some embodiments, the terminal 410 may transmit a value related to the VK 415 to the first BS 420 via the second path. For example, the value related to the VK 415 may be a value which is processed based on the VK 415 in order for the VK 415 to be easily transmitted in a wireless environment. In another example, the value related to the VK 415 may be a value which is processed based on the VK 415 in order to prevent the VK 415 from being exposed to the outside.

The VK 415 or the value related to the VK 415 may be referred to as a first reserve parameter.

FIG. 4 illustrates an example of the terminal 410 transmitting the VK 415 or the value related to the VK 415, but, according to an embodiment, the VK 415 may be generated in the first BS 420.

The first BS 420 may be a BS of the first system. The first BS 420 may be a BS which is functionally connected with the second BS via an internal interface or the like. The first BS 420 may be a BS which exchanges control information with the terminal 410 via the second path. The first BS 420 may be a BS which exchanges data with the terminal 410 via the first path.

The first BS 420 may receive the VK 415 via the second path. In some embodiments, the first BS 420 may receive the value related to the VK 415 via the second path. In this case, the first BS 420 may restore the VK 415 by signal-processing (for example, decoding) the value related to the VK 415.

The first BS 420 may generate an assistance key (AK) 425. The assistance key 425 may be a key for generating the SK. The assistance key 425 may be referred to as a counter or the like. In addition, the assistance key 425 may be referred to as a second reserve parameter.

The assistance key 425 may be a key which is distinguished according to a terminal and generated. For example, the first BS 420 may generate the assistance key 425 for a terminal 'A' which has transmitted the VK 415, and may generate the assistance key 425 for a terminal 'B' which has transmitted the VK 415.

The assistance key 425 may have various sizes. For example, the assistance key 425 may be configured with 16 bits. In another example, the assistance key 425 may be configured with 64 bits.

In some embodiments, the assistance key 425 may be generated by using a random function.

In some embodiments, the assistance key 425 may be generated according to a designated scheme based on an initial value. For example, it is assumed that terminal 'A,' the terminal 'B,' and the terminal 'C' transmit the VK 415 (or the value related to the VK 415) to the first BS 420 in order of the terminal 'A,' the terminal 'C', and the terminal 'B'. The first BS 420 may generate the assistance key 425 regarding the terminal 'A' based on a value increased (or reduced) by 1 from the initial value. The first BS 420 may generate the assistance key 425 regarding the terminal 'C' based on a value increased (or reduced) by 2 from the initial value. The first BS 420 may generate the assistance key 425 regarding the terminal 'B' based on a value increased (or reduced) by 3 from the initial value.

The first BS 420 may generate a temporary key (TK) 435 by processing the VK 415 and the assistance key 425 through a key derivation function (KDF) 430. In some embodiments, the first BS 420 may generate the TK 435 by processing information regarding the VK 415, the assistance key 425, and the lengths of the VK 415 and the assistance key 425 through the KDF 430. When the first BS 420 generates the VK 415, the first BS 420 may transmit information regarding the TK 435 to the terminal 410.

The first BS 420 may generate an original SK 445 by processing the TK 435, an algorithm ID (Alg-ID), and an algorithm distinguisher (UP-enc-alg) through a KDF 440. The algorithm ID may be a value indicating one of algorithms to be applied to the TK 435. The algorithms to be applied to the TK 435 may include various algorithms for generating the SK. For example, the algorithm ID and the algorithms to be applied to the TK 435 may be configured as shown in Table 1 presented below:

TABLE 1

| Algorithm ID | Description | Value |
|---|---|---|
| 128-EEA0 | Null ciphering algorithm | 0000 |
| 128-EEA1 | SNOW 3G | 0001 |
| 128-EEA2 | AES | 0010 |
| 128-EEA3 | ZUA (optional) | 0011 |
| 128-EIA1 | SNOW 3G | 0001 |
| 128-EIA2 | AES | 0010 |
| 128-EIA3 | ZUA (optional) | 0011 |

In Table 1, the algorithm ID may be one of 128-E1A1, 128-E1A2, and 128-E1A3 used for ciphering.

The algorithm distinguisher may be a value for distinguishing the function of the algorithm ID. For example, the algorithm distinguisher may be configured as shown in Table 2 presented below:

TABLE 2

| Algorithm Distinguisher | Value |
|---|---|
| NAS-enc-alg | 0x01 |
| NAS-int-alg | 0x02 |
| RRC-enc-alg | 0x03 |
| RRC-int-alg | 0x04 |
| UP-enc-alg | 0x05 |
| UP-int-alg | 0x06 |

In Table 2, the algorithm distinguisher may be an UP-eng-alg used for ciphering data.

Information regarding the algorithm ID and the algorithm distinguisher may be shared by the terminal 410 and the first BS 420 before the procedure for generating the SK.

In some embodiments, the terminal 410 may share the information regarding the algorithm ID and the algorithm distinguisher with the first BS 420 in an authentication procedure with the second BS. For example, the terminal 410 may transmit, to the MME, an attach request message including UE network capability. The UE network capability may include information regarding security algorithms which are usable by the terminal 410 for security of the second system, and information regarding algorithms which are usable by the terminal 410 for security of the first system (for example, information regarding the algorithm ID and the algorithm distinguisher). The terminal 410 and the first BS 420 may share the information regarding the algorithm ID and the algorithm distinguisher through the attach request message and an authentication request message corresponding to the attach request message.

In some embodiments, the terminal 410 may share the information regarding the algorithm ID and the algorithm distinguisher with the first BS 420 in an RRC signaling procedure with the first BS. For example, the terminal 410 may transmit a UE capability information message or the like to the first BS 420 via the second BS. The UE capability information message may include the information regarding the algorithm ID and the algorithm distinguisher, and/or the VK 415. The terminal 410 and the first BS 420 may share the information regarding the algorithm ID, the algorithm distinguisher, and/or the VK 415 through the UE capability information message and messages corresponding thereto.

The generated original SK 445 may have various sizes. For example, the original SK 445 may be configured with 256 bits.

The first BS 420 may generate a processed SK 455 by applying a truncation (Trunc) function 450 to the original SK 445. The processed SK 455 may have various sizes. For example, the processed SK 455 may be configured with 128 bits. Whether or not the truncation function 450 is used may be optional. For example, the first BS 420 may generate the processed SK 455 by truncating the original SK 445 in order to reduce complexity or the like based on the state of the first system or the like. In another example, when it is determined that it is not necessary to reduce the complexity or the like, the first BS 420 may not truncate the original SK 445 and may use the original SK 445.

In some embodiments, the first BS 420 may process the original SK 445 by using at least one function (or scheme). For example, the first BS 420 may generate the processed SK 455 by compressing or expanding the original SK 445.

The original SK 445 and the processed SK 455 may be generated according to various criteria. In some embodiments, the original SK 445 and the processed SK 455 may be generated according to a specific event (for example, an event in which the state of the terminal 410 or the first BS 420 is changed). In some other embodiments, the original SK 445 and the processed SK 455 may be generated according to a predetermined condition (for example, in a predetermined period, in response to an initial access, or the like).

As described above, the first BS 420 may generate the SK (for example, the original SK 445, the processed SK 455) for security of data of the first system by using a parameter received from the terminal 410 (for example, the VK 415), and a parameter generated by the first BS 420 (for example, the assistance key 425). Since the generated SK is based on the parameter received via the ciphering path and the parameter generated in the first BS 420, the SK may be robust to exposure to the outside.

Figure 5:
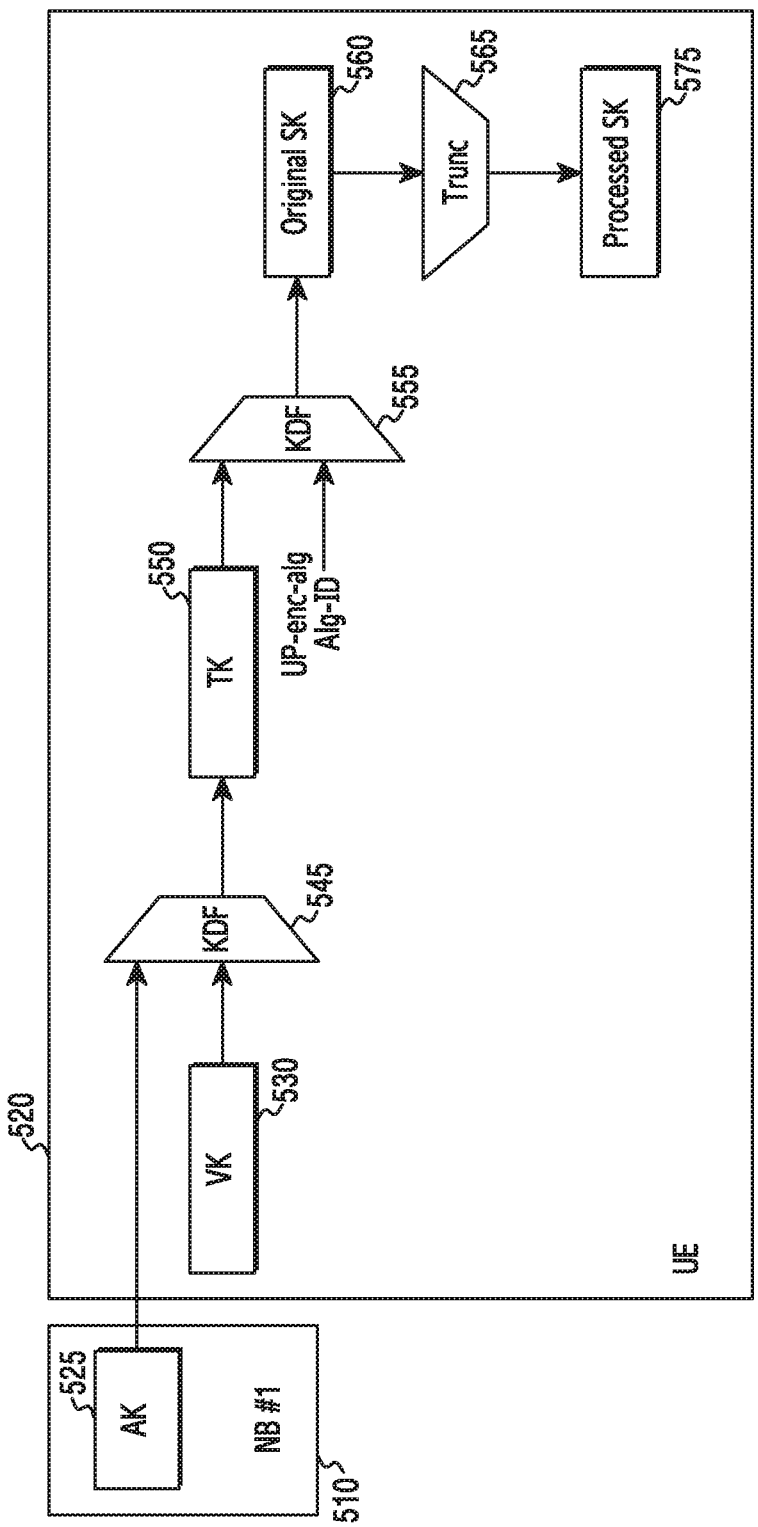
FIG. 5 illustrates a view showing an example of a procedure for generating, by a terminal, an SK by exchanging parameters between the terminal and a BS according to an embodiment of the present disclosure.

FIG. 5 illustrates a view showing an example of a procedure for generating, by a terminal, an SK by exchanging parameters between the terminal and a BS according to an embodiment of the present disclosure.

Referring to FIG. 5, a first BS 510 may be a BS which is functionally connected with a BS of the second system (that is, the second BS) via an internal interface or the like. The first BS 510 may be a BS which exchanges control information with the terminal 520 via the second path. The first BS 510 may be a BS which exchanges data with the terminal 520 via the first path.

The terminal 520 may be a terminal which connects to the second BS. In addition, the terminal 520 may be a terminal which performs an RRC connection procedure with the first BS 510.

The terminal 520 and the first BS 510 require an SK for security of data of a user plane which is transmitted or received via the first path.

The first BS 510 may generate an assistance key (AK) 525 for generating the SK. The assistance key 525 may correspond to the assistance key 425 of FIG. 4.

The first BS 510 may transmit the generated assistance key 525 to the terminal 520 via the second path. For example, the first BS 510 may transmit the assistance key 525 to the terminal 520 via the second path in an RRC signaling procedure, an RRC reconfiguration procedure, or the like. Since the assistance key 525 is transmitted via the second path, which is a ciphering path, the assistance key 525 may be robust to exposure to the outside.

In some embodiments, the first BS 510 may transmit a value related to the assistance key 525 to the terminal 520 via the second path. For example, the value related to the assistance key 525 may be a value which is processed based on the assistance key 525 in order for the assistance key 525 to be easily transmitted in a wireless environment. In another example, the value related to the assistance key 525 may be a value which is processed based on the assistance key 525 in order to prevent the assistance key 525 from being exposed to the outside.

The assistance key 525 or the value related to the assistance key 525 may be generally referred to as a second reserve parameter.

FIG. 5 illustrates an example of transmitting the assistance key 525 or the value related to the assistance key 525 to the terminal 520, but, according to various embodiments of the present disclosure, the assistance key 525 may be generated in the terminal 520.

The terminal 520 may receive the assistance key 525 or the value related to the assistance key 525 which is transmitted from the first BS 510. In some embodiments, the terminal 520 may receive the value related to the assistance key 525 via the second path. In this case, the terminal 520 may restore the assistance key 525 by signal-processing (for example, decoding) the value related to the assistance key 525.

The terminal 520 may generate a VK 530. The VK 530 may correspond to the VK 415 of FIG. 4. The VK 530 may be referred to as a first reserve parameter.

The terminal 520 may generate a TK 550 by processing the assistance key 525 and the VK 530 through a KDF 545. In some embodiments, the terminal 520 may generate the TK 550 by processing information regarding the assistance key 525, the VK 530, and the lengths of the assistance key 525 and the VK 530 through the KDF 545. When the first BS 510 generates the TK 550, the terminal 520 may receive information regarding the TK 550 from the first BS 510 via the second path.

The terminal 520 may generate an original SK 560 by processing the TK 550, an algorithm ID, and an algorithm distinguisher through a KDF 555. The algorithm ID may be a value indicating one of algorithms to be applied to the TK 550. The algorithms to be applied to the TK 550 may include various algorithms for generating an SK. For example, the algorithm ID and the algorithms to be applied to the TK 550 may be configured as shown in Table 1 presented above. The algorithm distinguisher may be a value for distinguishing the function of the algorithm ID. For example, the algorithm distinguisher may be configured as shown in Table 2 presented above.

Information regarding the algorithm ID and the algorithm distinguisher may be shared by the first BS 510 and the terminal 520 through the same or similar procedure (method) as that of the information regarding the algorithm ID and the algorithm distinguisher of FIG. 4.

The generated original SK 560 may correspond to the original SK 445 of FIG. 4.

The terminal 520 may generate a processed SK 575 by applying a truncation function (Trunc) 565 to the original SK 560. Whether or not the truncation function 565 is applied may be optional. The truncation function 565 may correspond to the truncation function 450 of FIG. 4.

In some embodiments, the terminal 520 may process the original SK 560 by using at least one other function (or scheme). For example, the terminal 520 may generate the processed SK 575 by compressing or expanding the original SK 560.

The original SK 560 and the processed SK 575 may correspond to the original SK 445 and the processed SK 455 of FIG. 4.

As described above with reference to FIGS. 4 and 5, the terminal and the first BS may secure data transmitted or received via the first path by using the generated SKs (for example, the original SK 445, the processed SK 455, the original SK 560, the processed SK 575, or the like).

According to various embodiments, since the generated SKs are generated by exchanging parameters between the first BS and the terminal, the SKs may be robust to a danger such as hacking. In addition, according to various embodiments, since the generated SKs are generated based on a parameter defined as being terminal (UE)-specific or BS (NB)-specific, illegal use of non-authorized users can be effectively prevented.

Figure 6:
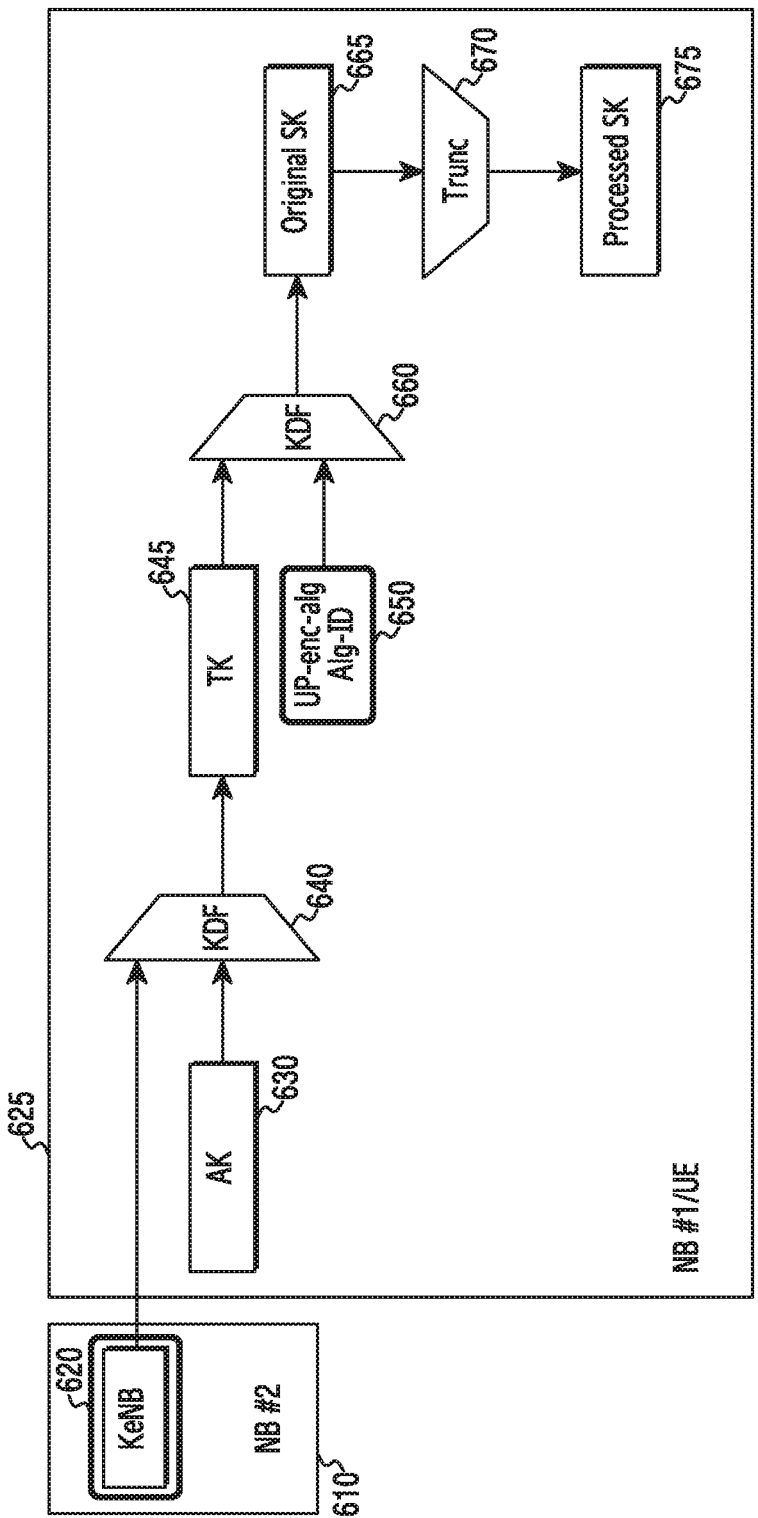
FIG. 6 illustrates a view showing an example of a procedure for generating an SK using a key of another system according to an embodiment of the present disclosure.

FIG. 6 illustrates a view showing an example of a procedure for generating an SK using a key of another system according to an embodiment of the present disclosure.

Referring to FIG. 6, a second BS 610 may be a BS which is functionally connected with a first BS via an internal interface. The second BS 610 may be a BS which connects to a terminal.

The second BS 610 may transmit $K_{enB}$ 620 generated based on $K_{ASME}$ to the first BS/terminal 625 via a ciphering path (for example, the second path). The $K_{enB}$ 620 may be a key which is used for security of control information or data of the second system. In some embodiments, the second BS 610 may transmit a value related to the $K_{enB}$ 620. The value related to the $K_{enB}$ 620 may be a value which is processed based on the $K_{enB}$ 620 in order to prevent the $K_{enB}$ 620 from being exposed to the outside.

The first BS/terminal 625 may receive the $K_{enB}$ 620 or the value related to the $K_{enB}$ 620. When the value related to the $K_{enB}$ 620 is received, the first BS/terminal 625 may restore the $K_{enB}$ 620 by signal-processing the value related to the $K_{enB}$ 620.

The first BS/terminal 625 may generate an assistance key (AK) 630. The assistance key 630 may be referred to as a counter or the like. In addition, the assistance key 630 may be referred to as a second reserve parameter. The assistance key 630 may be a key which is distinguished according to a terminal communicating with the first BS and generated. The assistance key 630 may have various sizes. For example, the assistance key 630 may be configured with 16 bits. In another example, the assistance key 630 may be configured with 64 bits.

In some embodiments, the assistance key 630 may be generated by using a random function. In some other embodiments, the assistance key 630 may be generated according to a designated scheme based on an initial value.

According to various embodiments, the terminal may not directly generate the assistance key 630 and may receive the assistance key 630 from the first BS via the second path.

The first BS/terminal 625 may generate a TK 645 by processing the $K_{enB}$ 620 and the assistance key 630 through a KDF 640. In some embodiments, the first BS/terminal 625 may generate the TK 645 by processing information regarding the $K_{enB}$ 620, the assistance key 630, and the lengths of the $K_{enB}$ 620 and the assistance key 630 through the KDF 640.

The first BS/terminal 625 may generate an original SK 665 by processing the generated TK 645 and an algorithm ID (Alg-ID) and algorithm distinguisher (UP-enc-alg) 650 through the KDF 660. The generated original SK 665 may have various sizes. For example, the original SK 665 may be configured with 256 bits.

The first BS/terminal 625 may generate a processed SK 675 by applying a truncation (Trunc) function 670 to the original SK 665. The processed SK 675 may have various sizes. For example, the processed SK 675 may be configured with 128 bits. Whether or not the truncation function 670 is used may be optional. For example, the first BS/terminal 625 may generate the processed SK 675 by truncating the original SK 665 based on the state of the first system or the like. In another example, when it is determined that it is not necessary to reduce the original SK 665, the first BS/terminal 625 may not truncate the original SK 665 and may use the original SK 665.

In some embodiments, the first BS/terminal 625 may process the original SK 665 by using at least one other function (or scheme). For example, the first BS/terminal 625 may generate the processed SK 675 by compressing or expanding the original SK 665.

The original SK 665 and the processed SK 675 may be generated according to various criteria. For example, the original SK 665 and the processed SK 675 may be generated in a predetermined period. In another example, the original SK 665 and the processed SK 675 may be generated according to a channel state between the terminal and the BS. In still another example, the original SK 665 and the processed SK 675 may be generated according to the type of a procedure performed between the terminal and the BS.

The various embodiments described with reference to FIG. 6 disclose a procedure for generating an SK using a pre-deployed system (for example, the second system). In the case of this procedure, complexity can be reduced and compatibility with the pre-deployed system (for example, the second system) can be enhanced.

Figure 7:
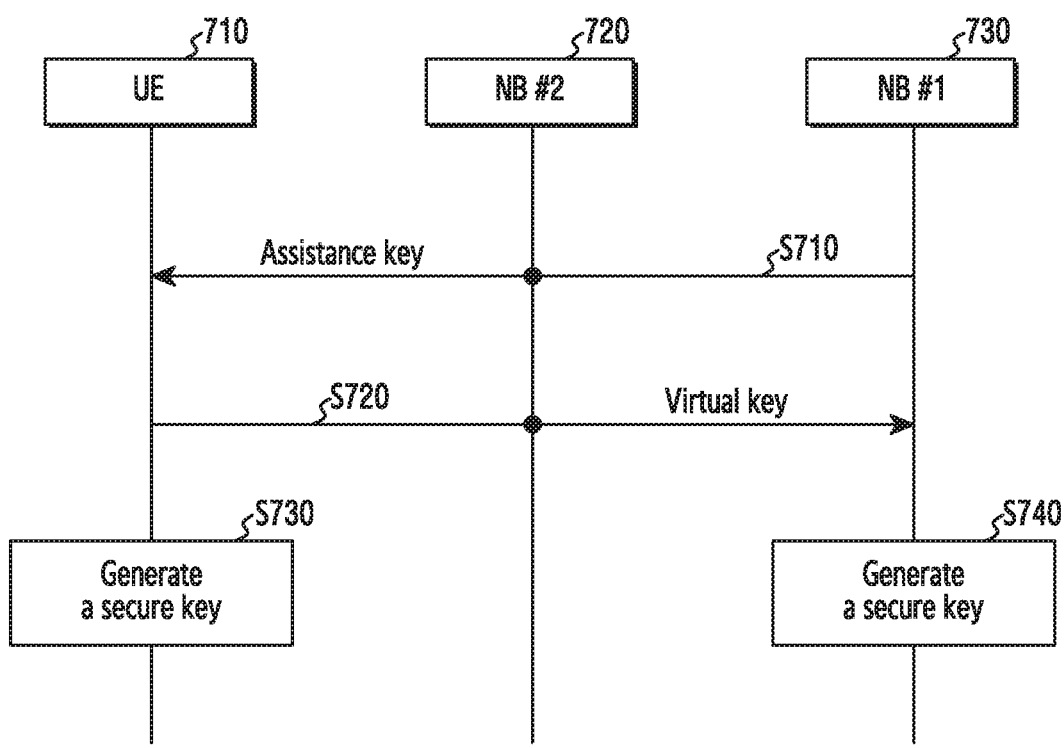
FIG. 7 illustrates a view showing an example of a signal flow between a terminal and a BS for generating an SK by exchanging parameters between the terminal and the BS according to an embodiment of the present disclosure.

FIG. 7 illustrates a view showing an example of a signal flow between a terminal and a BS for generating an SK by exchanging parameters between the terminal and the BS according to an embodiment of the present disclosure.

Referring to FIG. 7, a terminal 710 may be a terminal which connects to a second BS 720. The terminal 710 may be a terminal which tries to connect to a first BS 730.

The second BS 720 may be a BS for the second system, and the first BS 730 may be a BS for the first system.

The second BS 720 may be a BS which is functionally connected with the first BS 730 via an internal interface. In some embodiments, the second BS 720 may relay between the first BS 730 and the terminal 710. For example, the second BS 720 may provide control information transmitted by the first BS 730 to the terminal 710, and may provide control information transmitted by the terminal 710 to the first BS 730. In another example, the second BS 720 may provide the assistance key or the like transmitted by the first BS 730 to the terminal 710, and may provide the VK or the like transmitted by the terminal 710 to the first BS 730.

In operation S710, the first BS 730 may transmit the assistance key to the terminal 710 via the second BS 720. The first BS 730 may transmit the assistance key to the terminal 710 via the second BS in order to use a ciphering path. The assistance key may be generated in various methods. For example, the assistance key may be generated in the methods described in FIG. 4 or 5. In addition, the assistance key may be transmitted in various formats. For example, the assistance key may be directly included in a message and transmitted. In another example, the assistance key may be processed as a value related to the assistance key and transmitted.

In operation S720, the terminal 710 may transmit the VK to the first BS 730 via the second BS 720. The terminal 710 may transmit the VK to the first BS 730 via the second BS in order to use a ciphering path. The VK may be generated in various methods. For example, the VK may be generated in the methods described in FIG. 4 or 5. In addition, the VK may be transmitted in various formats. For example, the VK may be directly included in a message and transmitted. In another example, the VK may be processed as a value related to the VK and transmitted.

Unlike in the example of FIG. 7, operations S710 and S720 may be performed in reverse order or may be performed simultaneously. For example, operations in operation S720 may be performed first and then operations in operation S710 may be performed in each entity (for example, the terminal 710, the second BS 720, and the first BS 730).

In operation S730, the terminal 710 may generate an SK based on the received assistance key and the VK. The SK may be a key for security of data which is used in direct communication between the terminal 710 and the first BS 730.

In operation S740, the first BS 730 may generate an SK based on the received VK and the assistance key. The SK may be a key for security of data which is used in direct communication between the terminal 710 and the first BS 730. The SK generated in the first BS 730 may correspond to the SK generated in the terminal 710.

The terminal 710 and the first BS 730 may generate the SKs by exchanging parameters via a ciphering path. Accordingly, the SKs generated in the terminal 710 and the first BS 730 may have high security efficiency. For example, even when one parameter (one of a parameter (VK) transmitted from the terminal to the BS and a parameter (assistance key) transmitted from the BS to the terminal) is exposed to an unauthorized user in a previous procedure, the SKs generated in the terminal 710 and the first BS 730 can maintain high security efficiency since the other parameter is not exposed. In addition, since the SKs generated in the terminal 710 and the first BS 730 are generated by transmitting and receiving parameters using a pre-installed system (the second system), the SKs may have high compatibility with the pre-installed system.

Figure 8:
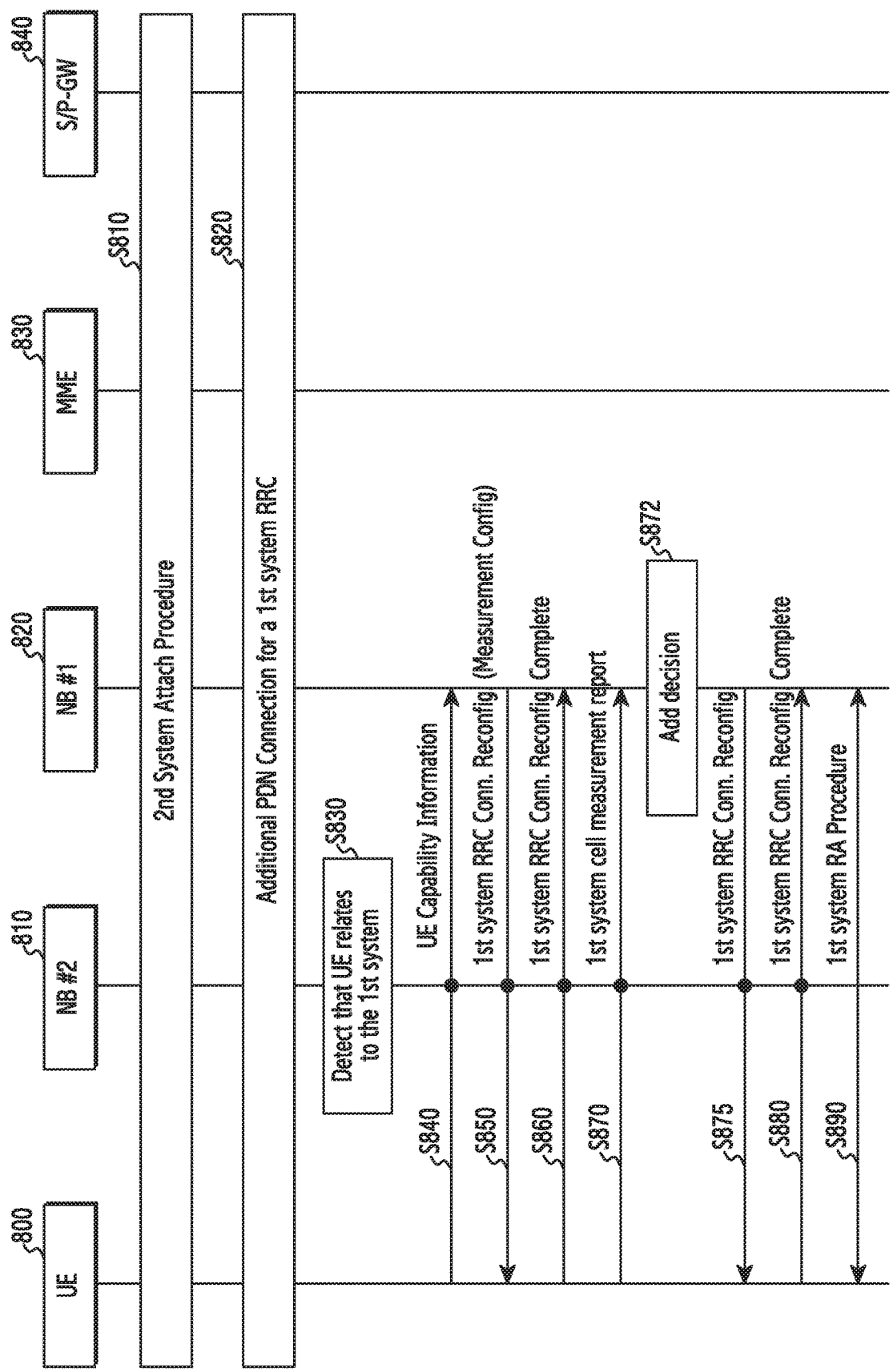
FIG. 8 illustrates a view showing another example of a signal flow between a terminal and a BS for generating an SK by exchanging parameters between the terminal and the BS according to an embodiment of the present disclosure.

FIG. 8 illustrates a view showing another example of a signal flow between a terminal and a BS for generating an SK by exchanging parameters between the terminal and the BS according to an embodiment of the present disclosure.

Referring to FIG. 8, in operation S810, a terminal 800, a second BS 810, an MME 830, and an S/P-GW 840 may perform a connection procedure of the second system. The connection procedure of the second system may include an international mobile station identity (IMSI) acquisition procedure, an authentication procedure, a NAS security setup procedure, a location update procedure, an evolved packet system (EPS) session establishment procedure, or the like.

In operation S820, the terminal 800, the second BS 810, and a first BS 820 may establish an additional packet data network (PDN) connection for the first system RRC via the second BS 810. In addition, the terminal 800 may generate the VK.

In operation S830, the second BS 810 may detect that the terminal 800 is related to the first system. The second BS 810 may recognize that the terminal 800 has the capability to transmit or receive a signal regarding the first system. The second BS 810 may recognize that the terminal 800 wants to connect to the first BS 820.

In operation S840, the terminal 800 may transmit a UE capability information message to the first BS 820 via the second BS 810. The transmitted UE capability information message may include UE-category, PDCP parameters, RF parameters, measurement parameters, and/or inter-radio access technology (RAT) parameters. In some embodiments, the transmitted UE capability information message may further include information regarding the algorithm ID to be applied to the TK or the like, the algorithm distinguisher, and/or the VK 415 in order to generate the SK.

In operation S850, the first BS 820 may transmit, to the terminal 800 via the second BS 810, an RRC connection reconfiguration message for the first system. The RRC connection reconfiguration message for the first system may include measurement configuration information which is set based on the UE capability information message.

In operation S860, the terminal 800 may transmit, to the first BS 820 via the second BS 810, an RRC connection reconfiguration complete message for the first system. The RRC connection reconfiguration complete message for the first system may be a response message to the RRC connection reconfiguration message for the first system.

In operation S870, the terminal 800 may transmit, to the first BS 820 via the second BS 810, a cell measurement report message for the first system.

In operation S872, the first BS 820 may determine whether to connect to the terminal 800 based on the received cell measurement report message for the first system.

When it is determined that the first BS 820 connects to the terminal 800, the first BS 820 may transmit, to the terminal 800 via the second BS 810, the RRC connection reconfiguration message for the first system in operation S875. The RRC connection reconfiguration message for the first system in operation S875 may include the assistance key or the value related to the assistance key. According to various embodiments, the RRC connection reconfiguration message for the first system in operation S875 may further include information regarding a used algorithm ID and an algorithm distinguisher. In addition, according to various embodiments, when the first BS 820 generates the VK 415, the RRC connection reconfiguration message for the first system may further include information regarding the TK 435.

In operation S880, the terminal 800 may transmit the RRC connection reconfiguration complete message for the first system based on the received RRC connection reconfiguration message. The RRC connection reconfiguration complete message for the first system in operation S880 may include the VK generated in operation S820 or the value related to the VK.

Through the procedure in operations S810, S820, S830, S840, S850, S860, S870, and S880, the terminal 800 and the first BS 820 may generate SKs for direct communication therebetween. For example, the terminal 800 may generate the SK based on the assistance key received in operation S875 and the VK generated in operation S820. The first BS 820 may generate the SK based on the assistance key generated by the first BS 820 and the VK received in operation S880.

In operation S890, the terminal 800 and the first BS 820 may perform a random access (RA) procedure for synchronization by using the generated SKs.

Through the operations in operations S810, S820, S830, S840, S850, S860, S870, S880, and S890, the terminal 800 and the first BS 820 can guarantee stability of data transmitted and received therebetween.

Figure 9:
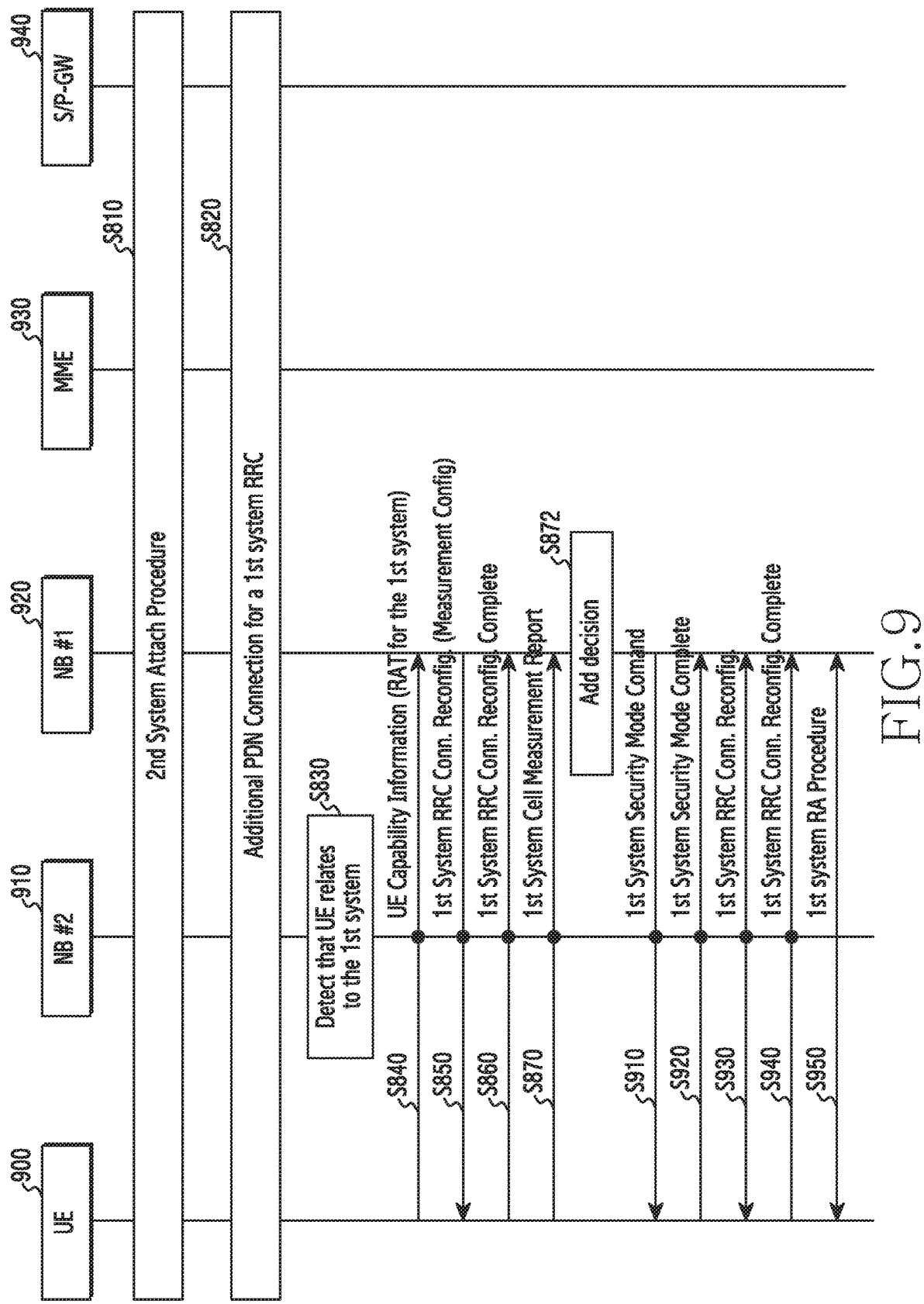
FIG. 9 illustrates a view showing an example of another signal flow between a terminal and a BS for generating an SK by exchanging parameters between the terminal and the BS according to an embodiment of the present disclosure.

FIG. 9 illustrates a view showing an example of another signal flow between a terminal and a BS for generating an SK by exchanging parameters between the terminal and the BS according to an embodiment of the present disclosure.

Referring to FIG. 9, a terminal 900, a second BS 910, a first BS 920, an MME 930, and an S/P-GW 940 may perform the operations in operations S810, S820, S830, S840, S850, S860, S870, and S872 through the same or similar operations as those of FIG. 8.

In operation S910, the first BS 920 may transmit, to the terminal 900 via the second BS 910, a security mode command message for the first system. The security mode command message may include the assistance key generated by the first BS 920 or the value related to the assistance key. According to various embodiments, the security mode command message for the first system may further include a downward PDCP count value, a message forwarding direction, a bearer ID, or the like.

In operation S920, the terminal 900 may transmit, to the first BS 920 via the second BS 910, a security mode complete message for the first system. The security mode complete message for the first system may be a response message to the security mode command message for the first system. The security mode complete message for the first system may include the VK generated by the terminal 900 or the value related to the VK.

In operation S930, the first BS 920 may transmit, to the terminal 900 via the second BS 910, an RRC connection reconfiguration message for the first system. The RRC connection reconfiguration message may include information for establishing a connection between the first BS 920 and the terminal 900. For example, the RRC connection reconfiguration message may include mobility control information, information regarding dedicated radio resource configuration, or the like.

In operation S940, the terminal 900 may transmit, to the first BS 920 via the second BS 910, the RRC connection reconfiguration complete message for the first system. The RRC connection reconfiguration complete message for the first system may be a response message to the RRC connection reconfiguration message for the first system.

As in the examples of the FIG. 9 described above, the terminal 900 and the first BS 920 may generate the SKs for communication therebetween.

In operation S950, the terminal 900 and the first BS 920 may perform a RA procedure for synchronization or the like by using the generated SKs.

Unlike in FIG. 8, in FIG. 9, the terminal 900 and the first BS 920 exchange parameters for generating the SKs through the security mode command message and the security mode complete message. Various implementations similar to this implementation may be implemented through various embodiments. For example, the parameters may be exchanged through a message other than the messages described in FIGS. 8 and 9 or through an entry procedure other than the procedures described in FIGS. 8 and 9.

Figure 10:
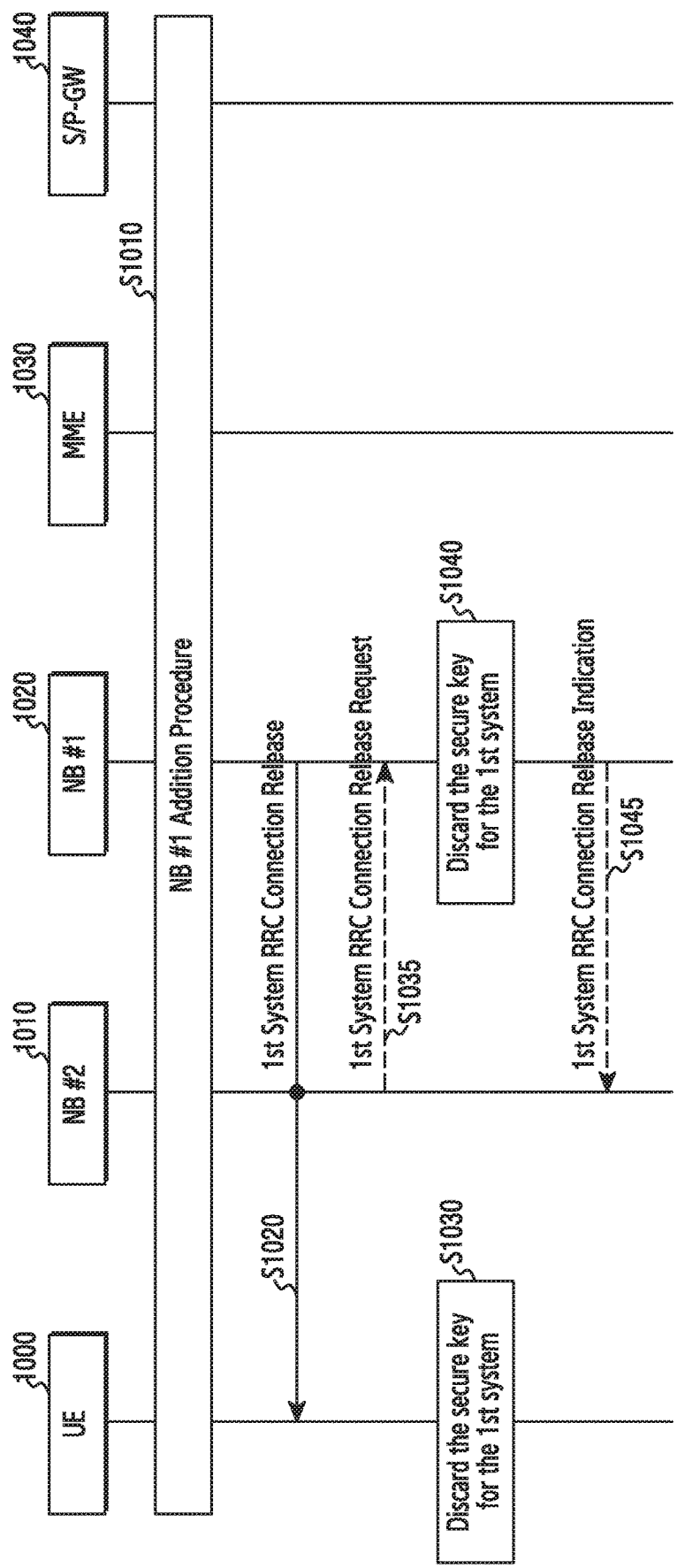
FIG. 10 illustrates a view showing an example of a signal flow between a terminal and a BS for deleting a generated SK according to an embodiment of the present disclosure.

FIG. 10 illustrates a view showing an example of a signal flow between a terminal and a BS for deleting a generated SK according to an embodiment of the present disclosure.

Referring to FIG. 10, in operation S1010, a terminal 1000, a second BS 1010, a first BS 1020, an MME 1030, and/or an S/P-GW 1040 may perform an additional procedure of the first BS 1020. Operation S1010 may be the same as or similar to the example of FIG. 8 or the example of FIG. 9.

In operation 51020, the first BS 1020 may transmit, to the terminal 1000 via the second BS 1010, an RRC connection release message for the first system. For example, when it is determined that the terminal 1000 is located out of the coverage area of the first BS 1020, the first BS 1020 may transmit, to the terminal 1000 via the second BS 1010, the RRC connection release message for the first system.

In operation S1030, the terminal 1000 may discard (or delete) the SK for the first system (for example, the SK generated through the procedures of FIGS. 4 to 9) in response to the RRC connection release message for the first system being received. This is because the connection with the first BS 1020 is released and the terminal 1000 has no benefit to store the generated SK. In some embodiments, the terminal 1000 may discard (or delete) information related to the discarded SK (for example, the VK, the assistance key, or the like).

In operation S1040, the first BS 1020 may discard (or delete) the SK (for example, the SK generated through the procedures of FIGS. 4 to 9) for the first system. In some embodiments, the first BS 1020 may discard (or delete) information related to the discarded SK.

In operation S1035, as an optional procedure, the second BS 1010 may transmit the first system RRC connection release request message regarding the terminal 1000. Since the second BS 1010 performs a relay role for control information between the terminal 1000 and the first BS 1020, the second BS 1010 may recognize a channel quality between the terminal 1000 and the first BS 1020 and a state between the terminal 1000 and/or the first BS 1020. Accordingly, on behalf of the terminal 1000 or the first BS 1020, the second BS 1010 may transmit the message to release the RRC connection of the first system to the first BS 1020. In this case, in operation S1040, the first BS 1020 may discard (or delete) the generated SK (or information related to the generated SK) in response to the message transmitted from the second BS 1010 being received. In this case, in operation S1045, the first BS 1020 may transmit an RRC connection release indication message of the first system to the second BS 1010. The RRC connection release indication message of the first system may be a response message to the first system RRC connection release request message. When the RRC connection release indication message of the first system is received, the second BS 1010 may notify the terminal 1000 that the RRC connection of the first system is released. In response to the notification, the terminal 1000 may discard (or delete) the generated SK as in operation S1030.

As described above, a method for operating a terminal (user equipment (UE)) connected to a second system in a wireless environment includes: receiving, from a BS (NB) of a first system via a BS of the second system, an assistance key; and generating a SK for security of the first system by using a VK and the received assistance key.

In some embodiments, the VK may be generated by the terminal by using a random function. In this case, the method for operating of the terminal may further include transmitting, to the BS of the first system via the BS of the second system, the generated VK. For example, the received assistance key may be received through a reconfiguration message transmitted from the BS of the first system, for a RRC connection of the first system. The transmitted VK may be transmitted to the BS of the first system through a response message corresponding to the reconfiguration message. In another example, the received assistance key may be received through a security mode command message transmitted from the BS of the first system, and the transmitted VK may be transmitted to the BS of the first system through a security command complete message corresponding to the security mode command message. In still another example, the VK may be transmitted to the BS of the first system through a UE capability information message.

In some other embodiments, the generated SK may be a key for security of data received from the BS of the first system or for security of data transmitted to the BS of the first system.

In some other embodiments, the method for operating of the terminal may further include establishing a PDN connection for the RRC connection via an EPC of the second system and the BS of the second system.

As described above, a method for operating of a first BS (NB) of a first system in a wireless environment includes: transmitting, to a terminal (UE) connected to a second system via a second BS of the second system, an assistance key; and generating an SK for security of the first system by using a VK and the assistance key.

In some embodiments, the VK may be generated by the terminal using a random function. In this case, the method for operating of the BS may further include receiving the generated VK from the terminal. For example, the assistance key may be transmitted through a reconfiguration message for a RRC connection of the first system, and the VK may be received from the terminal through a response message corresponding to the reconfiguration message. In another example, the assistance key may be transmitted through a security mode command message, and the VK may be received from the terminal through a security command complete message corresponding to the security mode command message.

In some other embodiments, the SK may be a key for security of data transmitted to the terminal or for security of data received from the terminal.

In some other embodiments, the generated SK may correspond to a second SK which is generated by the terminal based on the assistance key transmitted to the terminal and the VK.

Figure 11:
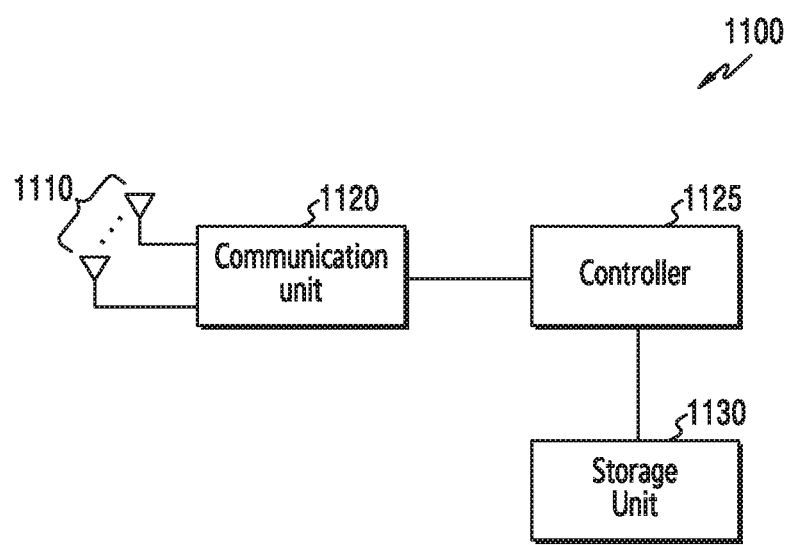
FIG. 11 illustrates a view showing an example of a functional configuration of an apparatus for generating an SK according to an embodiment of the present disclosure.

FIG. 11 illustrates a view showing an example of a functional configuration of an apparatus for generating an SK according to an embodiment of the present disclosure.

The functional configuration may be included in one of the terminal and the BS shown in FIGS. 1 to 10.

Referring to FIG. 11, an apparatus 1100 may include an antenna 1110, a communication unit 1120, a controller 1125, and a storage unit 1130.

The antenna 1110 may include one or more antennas. The antenna 1110 may be configured to be suitable for a multiple input multiple output (MIMO) scheme.

The communication unit 1120 may perform functions for transmitting or receiving signals via a radio channel.

The communication unit 1120 may perform a function of converting between a BB signal and a bit string according to a PHY layer standard of a system. For example, when transmitting data, the communication unit 1120 may generate complex symbols by encoding and modulating a transmission bit string. In another example, when receiving data, the communication unit 1120 may restore a reception bit string by demodulating and decoding a BB signal.

The communication unit 1120 may up-convert a BB signal into an RF band signal and transmit the signal via the antenna 1110. The communication unit 1120 may down-convert an RF band signal received via the antenna 1110 into a BB signal. For example, the communication unit 1120 may include a transmission filter, a reception filter, an amplifier, a mixer, an oscillator, a digital analog converter (DAC), an analog digital converter (ADC), or the like.

The communication unit 1120 may be operatively coupled to the controller 1125.

The communication unit 1120 may include at least one transceiver.

In addition, the communication unit 1120 may include at least one of a modem for the first system and a modem for the second system.

The controller 1125 may control overall operations of the apparatus 1100. For example, the controller 1125 may transmit or receive signals via the communication unit 1120. The controller 1125 may record data on the storage unit 1130 and may read out data recorded on the storage unit 1130. To achieve this, the controller 1125 may include at least one processor. For example, the controller 1125 may include a communication processor (CP) for controlling communication, and an application processor (AP) for controlling an upper layer such as an application program.

The storage unit 1130 may store a control command code, control data, or user data for controlling the apparatus 1100. For example, the storage unit 1130 may include an application, an OS, a middleware, and a device driver.

The storage unit 1130 may include at least one of a volatile memory or a non-volatile memory. The volatile memory may include a dynamic random access memory (DRAM), a static RAM (SRAM), a synchronous DRAM (SDRAM), a phase-charge RAM (PRAM), a magnetic RAM (MRAM), a resistive RAM (RRAM), a ferroelectric RAM (FeRAM), or the like. The nonvolatile memory may include a read only memory (ROM), a programmable ROM (PROM), an electrically programmable ROM (EPROM), an electrically erasable ROM (EEPROM), a flash memory, or the like.

The storage unit 1130 may include a nonvolatile medium such as a hard disk drive (HDD), a solid state disk (SSD), an embedded multi-media card (eMMC), or a universal flash storage (UFS).

The storage unit 1130 may be operatively coupled to the controller 1125.

As described above, an apparatus of a terminal (UE) connected to a second system in a wireless environment includes: a controller, and a communication unit operatively coupled to the controller, and the controller may be configured to receive, from a first BS of a first system via a second BS of the second system, an assistance key, and to generate an SK for security of the first system by using a VK and the received assistance key.

In some embodiments, the VK may be generated by the terminal by using a random function. In this case, the controller may further be configured to transmit, to the first BS of the first system via the second BS of the second system, the generated VK. For example, the received assistance key may be received through a reconfiguration message transmitted from the first BS of the first system, for an RRC connection of the first system. The transmitted VK may be transmitted to the first BS of the first system through a response message corresponding to the reconfiguration message. In another example, the received assistance key may be received through a security mode command message transmitted from the first BS of the first system, and the transmitted VK may be transmitted to the first BS of the first system through a security command complete message corresponding to the security mode command message. In still another example, the VK may be transmitted to the first BS of the first system through a UE capability information message.

In some other embodiments, the generated SK may be a key for security of data received from the first BS of the first system or for security of data transmitted to the first BS of the first system.

In some other embodiments, the controller may further be configured to establish a PDN connection for the RRC connection via an EPC of the second system and the second BS of the second system.

As described above, an apparatus of a first BS (NB) of a first system in a wireless environment includes: a controller; and a communication unit operatively coupled to the controller, and the controller may be configured to transmit, to a terminal (UE) connected to a second system via a second BS of the second system, an assistance key, and to generate an SK for security of the first system by using a VK and the assistance key.

In some embodiments, the VK may be generated by the terminal using a random function. In this case, the controller may further be configured to receive the generated VK from the terminal. For example, the assistance key may be transmitted through a reconfiguration message for an RRC connection of the first system, and the VK may be received from the terminal through a response message corresponding to the reconfiguration message. In another example, the assistance key may be transmitted through a security mode command message, and the VK may be received from the terminal through a security command complete message corresponding to the security mode command message.

In some other embodiments, the SK may be a key for security of data transmitted to the terminal or for security of data received from the terminal.

In some other embodiments, the generated SK may correspond to a second SK which is generated by the terminal based on the assistance key transmitted to the terminal and the VK.

Methods based on the embodiments disclosed in the claims or the various embodiments of the present disclosure may be implemented in hardware, software, or a combination of hardware and software.

When implemented in software, a computer readable recording medium for storing one or more programs (software modules) may be provided. The one or more programs stored in the computer readable recording medium are configured for execution performed by one or more processors in an electronic device. The one or more programs include instructions for allowing the electronic device to execute the methods based on the embodiments disclosed in the claims or the various embodiments of the present disclosure.

The program (software module or software) may be stored in a RAM, a non-volatile memory including a flash memory, a ROM, an EEPROM, a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), a storage area network (SAN), or a communication network configured by combining the networks. The storage device may access via an external port to the apparatus performing the various embodiments of the present disclosure. In addition, a separate storage device on the communication network may access the apparatus performing the various embodiments of the present disclosure.

In the various embodiments of the present disclosure described above, the elements included in the present disclosure are expressed in a singular form or a plural form according to an embodiment. However, the singular form or plural form is just selected to suit to a suggested situation for the sake of easy explanation, and the present disclosure is not limited to the single or plural elements. Even when an element is expressed in a plural form, the element may be provided as a single element, and, even when an element is expressed in a singular form, the element may be provided as a plurality of elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a base station (BS) for a first communication system connected to another BS for a second communication system, the method comprising:
generating a first key by applying a key derivation function (KDF) to a random value and a count value, the random value being generated by using a random function;
generating a secure key for a security of the first communication system based on the first key, an identifier (ID) for indicating an algorithm for applying to the first key, and an algorithm distinguisher corresponding to the algorithm indicated by the ID; and
transmitting, to a terminal connected to the other BS, a signal based on the secure key.

2. The method of claim 1, further comprising:
transmitting, via the other BS to the terminal, a radio resource control (RRC) connection reconfiguration message.

3. The method of claim 2, wherein the transmitting of the RRC connection reconfiguration message comprises:
transmitting, via the other BS to the terminal, a RRC connection reconfiguration message comprising information regarding a measurement configuration for measuring a cell of the BS;
receiving, via the other BS from the terminal, a report message comprising measurement information of the cell of the BS, wherein the measurement information is determined based on the measurement configuration;
determining, based on the report message, whether to connect with the terminal; and
transmitting, based on determining to connect with the terminal, the RRC connection reconfiguration message comprising information regarding the first key.

4. The method of claim 1, further comprising:
transmitting, via the other BS to the terminal, a RRC connection reconfiguration message comprising information regarding the ID and information regarding the algorithm distinguisher.

5. The method of claim 1,
wherein the random value is configured with 256 bits, and
wherein the count value is configured with 64 bits, and is set to a value increased by 1 whenever the random value is generated.

6. The method of claim 1, wherein the generating of the secure key comprises:
   generating a second key by applying the KDF to the first key, the ID, and the algorithm distinguisher; and
   generating the secure key by applying a truncation function to the second key.

7. The method of claim 6,
   wherein the second key is configured with 256 bits, and
   wherein the secure key is configured with 128 bits.

8. A method of a terminal connected to another base station (BS) for a second communication system in a wireless environment, the method comprising:
   receiving, via the other BS from a remote BS for a first communication system, a radio resource control (RRC) connection reconfiguration message comprising information regarding a first key;
   generating a secure key for a security of the first communication system based on the first key, an identifier (ID) for indicating an algorithm for applying to the first key, an algorithm distinguisher corresponding to the algorithm indicated by the ID; and
   transmitting, to the remote BS, a signal based on the secure key.

9. The method of claim 8, further comprising:
   receiving, via the other BS from the remote BS, a RRC connection reconfiguration message comprising information regarding measurement configuration for measuring a cell of the remote BS; and
   transmitting, via the other BS to the remote BS, a report message comprising measurement information of the cell of the remote BS determined based on the measurement configuration,
   wherein the RRC connection reconfiguration message comprising the information regarding the first key is received, from the BS via the other BS to the terminal, in response to determining that the BS connects with the terminal.

10. The method of claim 8, further comprising:
    receiving, from the remote BS via the other BS, a RRC connection reconfiguration message comprising information regarding the ID and information regarding the algorithm distinguisher.

11. The method of claim 8, wherein the first key is generated, by the remote BS, by applying a key derivation function (KDF) to a count value and a random value that is generated by using a random function.

12. The method of claim 11,
    wherein the random value is configured with 256 bits, and
    wherein the count value is configured with 64 bits, and is set to a value by increased by 1 whenever the random value is generated.

13. The method of claim 8, wherein the generating of the secure key comprises:
    generating a second key by applying a key derivation function (KDF) to the first key, the ID, and the algorithm distinguisher; and
    generating the secure key by applying a truncation function to the second key.

14. The method of claim 13,
    wherein the second key is configured with 256 bits, and
    wherein the secure key is configured with 128 bits.

15. A base station (BS) in a first communication system connected to another BS for a second communication system, the BS comprising:
    at least one transceiver; and
    at least one processor, coupled to the at least one transceiver, configured to:
       generate a first key by applying a key derivation function (KDF) to a random value and a count value, the random value generated by using a random function;
       generate a secure key for a security of the first communication system based on the first key, an identifier (ID) for indicating an algorithm for applying to the first key, and an algorithm distinguisher corresponding to the algorithm indicated by the ID; and
       transmit, to a terminal connected to the other BS, a signal based on the secure key.

16. The BS of claim 15, wherein the at least one processor is further configured to:
    transmit, via the other BS to the terminal, a radio resource control (RRC) connection reconfiguration message.

17. The BS of claim 16, wherein the at least one processor is further configured to:
    transmit, via the other BS to the terminal, a RRC connection reconfiguration message comprising information regarding a measurement configuration for measuring a cell of the BS,
    receive, via the other BS from the terminal, a report message comprising measurement information of the cell of the BS, the measurement information being determined based on the measurement configuration,
    determine, based on the report message, whether to connect with the terminal, and
    transmit, based on determining to connect with the terminal, the RRC connection reconfiguration message comprising information regarding the first key.

18. The BS of claim 15, wherein the at least one processor is further configured to:
    transmit, via the other BS to the terminal, RRC connection reconfiguration message comprising information regarding the ID and information regarding the algorithm distinguisher.

19. The BS of claim 15,
    wherein the random value is configured with 256 bits, and
    wherein the count value is configured with 64 bits, and is set to a value increased by 1 whenever the random value is generated.

20. The BS of claim 15, wherein the at least one processor is further configured to:
    generate a second key by applying the KDF to the first key, the ID, and the algorithm distinguisher; and
    generate the secure key by applying a truncation function to the second key.

21. The BS of claim 20,
    wherein the second key is configured with 256 bits, and
    wherein the secure key is configured with 128 bits.

22. A terminal connected to another base station (BS) for a second communication system in a wireless environment, the terminal comprising:
    at least one transceiver; and
    at least one processor, coupled to the at least one transceiver, configured to:
       receive, via the other BS from a BS for a first communication system, a radio resource control (RRC) connection reconfiguration message comprising information regarding a first key;
       generate a secure key for a security of the first communication system based on the first key, an identifier (ID) for indicating an algorithm for applying to the first key, an algorithm distinguisher corresponding to the algorithm indicated by the ID; and
       transmit, to the BS, a signal based on the secure key.

23. The terminal of claim 22, wherein the at least one processor is further configured to:
- receive, via the other BS from the BS, a RRC connection reconfiguration message comprising information regarding measurement configuration for measuring a cell of the BS; and
- transmit, via the other BS to the BS, a report message comprising measurement information of the cell of the BS that is determined based on the measurement configuration, and
- wherein the RRC connection reconfiguration message comprising the information regarding the first key is received from the BS via the other BS in response to determining that the BS connects with the terminal.

24. The terminal of claim 22, wherein the at least one processor is further configured to:
- receive, from the BS via the other BS, a RRC connection reconfiguration message comprising information regarding the ID and information regarding the algorithm distinguisher.

25. The terminal of claim 22, wherein the first key is generated by the BS by applying a key derivation function (KDF) to a count value and a random value that is generated by using a random function.

26. The terminal of claim 25,
- wherein the random value is configured with 256 bits, and
- wherein the count value is configured with 64 bits, and is set to a value by increased by 1 whenever the random value is generated.

27. The terminal of claim 22, wherein the at least one processor is further configured to:
- generate a second key by applying a key derivation function (KDF) to the first key, the ID, and the algorithm distinguisher; and
- generate the secure key by applying a truncation function to the second key.

28. The terminal of claim 27,
- wherein the second key is configured with 256 bits, and
- wherein the secure key is configured with 128 bits.

* * * * *